(12) United States Patent
Farley et al.

(10) Patent No.: US 7,502,351 B2
(45) Date of Patent: *Mar. 10, 2009

(54) ALTERNATE CHANNEL FOR CARRYING SELECTED MESSAGE TYPES

(75) Inventors: Kevin L. Farley, Palm Bay, FL (US); James A. Proctor, Jr., Indialantic, FL (US)

(73) Assignee: IPR Licensing, Inc., Wilmington, DE (US)

( * ) Notice: Subject to any disclaimer, the term of this patent is extended or adjusted under 35 U.S.C. 154(b) by 526 days.

This patent is subject to a terminal disclaimer.

(21) Appl. No.: 11/235,725

(22) Filed: Sep. 26, 2005

(65) Prior Publication Data

US 2006/0018293 A1    Jan. 26, 2006

Related U.S. Application Data

(63) Continuation of application No. 09/775,304, filed on Feb. 1, 2001, now Pat. No. 6,954,448.

(51) Int. Cl.
*H04J 3/16* (2006.01)
*H04B 7/00* (2006.01)

(52) U.S. Cl. .................. 370/337; 370/347; 370/442; 455/450; 455/509

(58) Field of Classification Search ............... 370/337, 370/347, 442; 455/450, 509
See application file for complete search history.

(56) References Cited

U.S. PATENT DOCUMENTS

| | | | |
|---|---|---|---|
| 5,166,929 A | 11/1992 | Lo | |
| 5,377,192 A | 12/1994 | Goodings et al. | |
| 5,903,834 A * | 5/1999 | Wallstedt et al. | 455/422.1 |
| 5,990,806 A | 11/1999 | Mock et al. | |
| 6,031,832 A * | 2/2000 | Turina | 370/348 |
| 6,169,759 B1 | 1/2001 | Kanterakis et al. | |
| 6,226,279 B1 * | 5/2001 | Hansson et al. | 370/329 |
| 6,236,646 B1 * | 5/2001 | Beming et al. | 370/335 |
| RE37,301 E | 7/2001 | Lo | |
| 6,301,286 B1 | 10/2001 | Kanterakis et al. | |
| 6,512,931 B1 * | 1/2003 | Kim et al. | 455/522 |
| 6,611,514 B1 | 8/2003 | Moulsley | |
| 6,621,807 B1 | 9/2003 | Jung et al. | |
| 6,628,945 B1 | 9/2003 | Korrapaty et al. | |
| 6,674,739 B1 | 1/2004 | Lee et al. | |
| 6,845,089 B1 | 1/2005 | Gu et al. | |
| 7,046,717 B2 * | 5/2006 | Kanterakis et al. | 375/141 |
| 7,079,507 B2 * | 7/2006 | Toskala et al. | 370/329 |
| 7,099,629 B1 * | 8/2006 | Bender | 455/69 |
| 7,158,504 B2 * | 1/2007 | Kadaba et al. | 370/348 |
| 7,266,107 B2 * | 9/2007 | Choi et al. | 370/341 |
| 7,340,256 B2 * | 3/2008 | Speight | 455/450 |

* cited by examiner

*Primary Examiner*—Alpus H Hsu
(74) *Attorney, Agent, or Firm*—Volpe and Koenig, P.C.

(57) ABSTRACT

In an illustrative embodiment of the present invention, a channel is allocated to carry messages from each of multiple subscriber units to a base station. Selected messages generated by a subscriber unit that would otherwise be transmitted over an assigned reverse link traffic channel are instead encoded and transmitted to the base station over a shared reverse link channel. Preferably, the shared reverse link channel is time-slotted and each subscriber unit transmits information to the base station in an assigned time slot so that the base station receiving the messages can identify from which subscriber unit a message is sent. Certain bits in a time slot of the shared channel as set by a subscriber unit can be used to communicate a particular message to the base station. For instance, a single bit that is transmitted in a time slot can be encoded to transmit a substitute message from one of the multiple subscriber units to a base station, where the setting of the bit itself indicates a message type.

25 Claims, 17 Drawing Sheets

| EPOCH OFFSET | JACK CHANNEL TIME SLOT # | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | A | B | C | D | E | F |
| +0 | | | | | | | | | | | | | | | | |
| +1 | | | | | | | | | | | | | | | | |
| +2 | | | | | | | | | | | | | | | | |
| +3 | | | | | | | | | | | | | | | | |

| LAYER 4 STREAM ID | 32-BIT SOURCE ADDRESS | 32-BIT DESTINATION ADDRESS | 16-BIT SOURCE PORT | 16-BIT DESTINATION PORT |
|---|---|---|---|---|
| 0001 | ~ | ~ | ~ | ~ |
| 0002 | ~ | ~ | ~ | ~ |
| 0003 | ~ | ~ | ~ | ~ |
| 0004 | ~ | ~ | ~ | ~ |

FIG. 6

ALTERNATE CHANNEL FOR CARRYING SELECTED MESSAGE TYPES

CROSS REFERENCE TO RELATED APPLICATIONS

This application is a continuation of U.S. patent application Ser. No. 09/775,304 filed Feb. 1, 2001, which issued as U.S. Pat. No. 6,954,448 on Oct. 11, 2005, which is incorporated by reference as if fully set forth.

BACKGROUND OF THE INVENTION

Network systems that provide reliable delivery of information typically use some form of acknowledgments (ACKs) or negative acknowledgments (NAKs) to notify a sender that data transmitted from a source is properly received at a target device. For instance, the TCP/IP (Transfer Control Protocol/Internet Protocol) supports bi-directional data message traffic where feedback messages in a reverse direction of a data block transmission indicate whether or not the block of data is properly received at a target device.

Most packet-switched systems in which digital information is transmitted over a wireless, bi-directional link attempt to improve efficiency and maximize capacity by allocating bandwidth on an as-needed basis. That is, a reverse direction traffic channel for carrying acknowledgment messages as previously discussed is allocated for use only when such messages become available for transmission to a source in response to the reception of data at a target device. In these systems, bandwidth must be allocated and deallocated dynamically so that wireless resources for transmitting ACK messages are not dedicated when no ACK messages are being transmitted. This process of allocating and de-allocating traffic channels for the transmission of these sporadically generated ACK messages is cumbersome because there is substantial overhead processing required to allocate and deallocate channels to multiple subscriber units competing for their use. In this instance, wireless resources are wasted to the extent that channels cannot be utilized in a reverse link until a confirmation is received from a subscriber unit that a channel is properly assigned. Thus, there can be a substantial delay between the time a subscriber wishes to transmit and the time it is able to do so.

Rather than assigning channels on an as-needed basis, a wholly dedicated wireless channel in a reverse direction can be allocated for use by a particular subscriber unit to support the transmission of sporadically generated messages. However, the continuous allocation of an entire channel for such messages is often a waste of resources, especially when multiple users are competing for their use and the channel is capable of carrying much more traffic than merely occasional messages.

SUMMARY OF THE INVENTION

The present invention is generally directed towards a method and system for enhancing the utilization of resources in a wireless communication system. In an illustrative embodiment, a shared channel is allocated to carry selected messages from each of multiple subscriber units to a base station. These selected messages as generated by a subscriber unit, which can otherwise be transmitted over an assigned reverse link traffic channel, are instead encoded and transmitted to the base station over a shared reverse link channel. Preferably, the shared reverse link channel is time-slotted and each subscriber unit transmits information to the base station in an assigned time slot so that the base station receiving the selected messages can identify from which subscriber unit a message is sent.

The shared channel is optionally structured so that bits in a time slot have a specified meaning. More specifically, certain bits in a time slot of the shared channel as transmitted by a subscriber unit are used to communicate a particular message to the base station. For instance, a single bit itself can be used to transmit a message, where the setting of the bit in the time slot indicates a message-type. In an application where the single bit is an ACK/NAK bit (Acknowledgment/No Acknowledgment bit), a logic one can indicate that a message is an "acknowledgment" message while a logic zero can indicate that a message is a "no acknowledgment" message. Thus, a base station transmitting information over a forward link channel to a subscriber unit can be provided feedback via reverse link messages transmitted in a shared channel to indicate whether the forward link messages are appropriately received at the subscriber unit.

In an application where messages are not transmitted in every frame, i.e., an acknowledgment message is not sent to the base station every periodically repeating time slot from a subscriber unit, a complementary data valid bit can be used to indicate that the setting of other bits, such as the ACK/NAK bit as previously described, are meaningless. In this way, two bits can be used to communicate a message to the base station. More specifically, a complementary data valid bit can be set as a logic one to indicate that the ACK/NAK bit is valid while the ACK/NAK bit itself can be used to identify the type of acknowledgment message as previously discussed. Alternatively, the complementary data valid bit can be set as a logic zero to indicate that the setting of the ACK/NAK bit is meaningless and that no message is being sent. It is therefore possible for an assigned subscriber unit not to transmit a message to the base station for every successive and periodically repeating time slot of the shared channel.

According to this method, a message that would otherwise be transmitted along with other data payload messages on a reverse link traffic channel to the base station can be converted into a substitute message that is encoded as one or two bits of information in a time slot of the shared reverse link channel. A selected message type can therefore be transmitted to a target device using fewer bits than would otherwise be necessary if the same message was transmitted over a communication link along with a set of random data packets that must be decoded to determine their content. Another advantage of the methods according to the principles of the present invention is that a processing unit receiving a reverse link message in a time slot can identify a corresponding message-type in less time since it is not necessary to process multiple layers of a data packet to determine its contents. Rather, the bit settings within a time slot of a monitored shared channel can be decoded to determine a message-type, where the time-slots themselves indicate from which of multiple field units the message pertains.

Another aspect of the present invention involves supporting multiple types of network messages in a given time-slot of the shared reverse link channel. For example, the time slotted channel can include multiple acknowledgment messages, each of which is generated at different network layers. The time-slotted channel also can be structured to support multiple message-types other than acknowledgment messages.

Yet another aspect of the present invention involves providing additional bit information to define other attributes of a message. For example, certain bits of a message can be used to identify a layer 2 frame number indicating which of multiple FEC frames of a data payload transmitted over a forward link channel is being acknowledged by a receiving subscriber unit in a time-slot of the reverse link channel. Preferably, the layer 2 frame number is encoded in a time slot as a 3-bit sequence indicating the frame number of the FEC frame received or not received at a corresponding subscriber unit. According to this method of acknowledging properly or improperly received frames at a subscriber unit, the base station can be notified which if any frames must be re-transmitted.

Layer 3 ACK/NAK messages as transmitted over the reverse link can include multiple bits to identify a particular superframe that is being acknowledged as a result of data transmissions over a forward link channel. A superframe is a block of data such as a TCP/IP (Transfer Control Protocol/Internet Protocol) data packet that is typically reduced in size before transmission over multiple frames of the forward link channel. The process of transmitting a data block to a target subscriber unit first involves receiving a block of data such as an IP (Internet Protocol) network packet at the base station. Prior to transmission over the wireless link, the network packet is preferably subdivided into multiple segments. These segments are then transmitted to a subscriber unit over multiple frames of the forward link channel. Segments received at a subscriber unit are then reassembled to reconstruct the original IP packet or superframe. This recaptured data block or superframe is then forwarded to, for example, a target PC device coupled to the subscriber unit. Meanwhile, an acknowledgment message is generated at the subscriber unit indicating whether the entire superframe is received at the subscriber unit. Preferably, this layer 3 acknowledgment message transmitted in time slot of the shared reverse link channel includes a bit sequence indicating which particular superframe is being acknowledged. More specifically, a time slot can include indicator bits identifying whether a layer 3 message is an ACK or NAK. A time slot can further include encoded bits indicating the particular number of the superframe to which the acknowledgment message pertains.

The principles of the present invention can also be used to support layer 4 acknowledgment messages. Layer 4 acknowledgment messages are generated by a PC device coupled to the subscriber unit. These acknowledgment messages are transmitted in a reverse direction to the base station to indicate a reception of a data block such as a TCP/IP network packet or superframe transmitted to the subscriber unit over the forward link. Rather than transmit a layer 4 acknowledgment network packet over a reverse link traffic channel in its original form as done with forward link data transmissions, the subscriber unit creates a substitute message that is transmitted in a corresponding time slot over the shared reverse link channel. This involves identifying a layer 4 acknowledgment message at the subscriber unit and encoding it in a bit sequence of a time slot so that the base station upon receipt can reconstruct meaningful aspects of the message as originally generated by the PC device.

In this way, a network message generated by a PC device is intercepted at a subscriber unit and is encoded as a substitute message that is transmitted in a time slot to the base station. The base station then decodes the message received in the time slot and reconstructs the original or substantially similar network message. After the substitute message as received in a time slot is reconstructed into an original or substantially similar network packet at the base station, the network message is forwarded to the appropriate target device on, for example, a wired network in communication with the base station.

One application of the inventive shared channel is a reverse link of a CDMA (Code Division Multiple Access) communication system. In such a system, data blocks of network packets corresponding to a particular connection between a client and server are presented to a base station transmitter where they are repackaged into manageably sized sub-packets for transmission to a particular subscriber unit over a wireless link. As previously discussed, a shared time-slotted reverse link channel is used to carry selected message-types that would otherwise be transmitted along with a data payload over an assigned reverse link traffic channel. For example, ACK and NAK messages pertaining to one of multiple TCP/IP network sessions of corresponding subscriber units could otherwise be transmitted over multiple dedicated reverse link channels on an as-needed basis. However, according to the principles of the present invention, the messages are instead transmitted over the shared channel.

In a preferred embodiment, time-slots are implicitly assigned for use by subscriber units based on the allocation of forward link channels. For example, a subscriber unit is optionally allocated use of a time slot in the shared reverse link depending on which traffic channels are allocated in the forward link to transmit a data payload to the subscriber unit. More specifically, if the base station transmits forward link messages such as a data payload on traffic channel #1, time slot #1 of the shared reverse link channel is implicitly assigned for use by that particular subscriber unit to transmit feedback information in a reverse link path. Use of a particular time slot by a newly assigned subscriber unit is preferably delayed so that the subscriber unit can receive and process data received on the newly assigned forward link channel and respond appropriately in the reverse link time slot.

In an alternate embodiment, one or multiple time slots are explicitly assigned for use by a subscriber unit via a corresponding message sent on a forward link channel from the base station to a corresponding subscriber unit.

Notably, a subscriber unit can receive data information from the base station on multiple forward link traffic channels while providing corresponding feedback messages on multiple implicitly assigned time slots of the shared reverse link channel.

If no forward link channels are assigned for use by a particular field unit and no time slots are available for allocation in the shared reverse link channel, information can be transmitted from the field unit to the base station via the assignment of reverse link traffic channels.

As previously discussed, the shared channel can be structured to encode network messages generated at multiple layers. Alternately, the shared channel can be an unstructured channel partitioned into time slots that carry generic payload data. For example, a network message or raw data can be encoded in a time slot of the shared channel where a receiver device must decode a data payload to determine a message type. Thus, the shared channel can carry any type of message and not just acknowledgment or feedback messages. For instance, a data payload transmitted in a time slot of the shared channel can be a maintenance message to support a corresponding link between the field unit and base station. Otherwise, such data can be transmitted over a traffic channel.

Another aspect of the present invention involves allocating additional bandwidth such as a reverse link traffic channel for transmitting a data message to the base station when throughput capacity afforded by an assigned time slot is exceeded. That is, if a field unit must transmit more information to the base station than is possible via an assigned time slot, at least part of a reverse link traffic channel is additionally assigned for use by the field to transmit information to the base station.

Preferably, a shared reverse link time-slotted feedback channel repeats on a periodic basis so that feedback is provided on a discrete but continuous basis to the base station when a time slot is assigned to a subscriber unit. Thus, minimal resources can be used to transmit feedback or other types of messages in a reverse link direction of the wireless communication system. This aspect of the present invention is particularly advantageous in applications where a large data block such as web page information is transmitted from the base station to a subscriber unit and it is necessary to support at least a minimal communication in the reverse direction back to the base station.

Multiple subscriber units compete for the use of wireless channel resources in most wireless communication systems. As previously discussed, there is often high demand for data throughput on the forward link channel to carry data payloads such as web page information to remotely located subscriber units. To support high throughput of data, multiple traffic channels are allocated on an as-needed basis to support such data transfers on the forward link to the subscriber unit. In this application, sporadically generated ACK and NAK messages are transmitted in a reverse link from the subscriber unit to the base station. According to this aspect of the present invention as discussed, reverse link messages are encoded as substitute messages that are transmitted over a time-slotted reverse link channel. This reduces the overhead associated with the allocation of a whole a reverse link traffic channel to a corresponding subscriber unit every time a sporadic ACK or NAK message must be transmitted to the base station.

Alternatively, a portion of a time-slotted reverse-link traffic channel can be assigned on a continuous basis to a subscriber unit for transmitting occasional messages to the base station.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 5 is a table for tracking time slot assignments of a joint acknowledgment channel according to the principles of the present invention.

FIG. 6 is a table for tracking individually established communication sessions according to the principles of the present invention.

DETAILED DESCRIPTION OF THE INVENTION

A description of preferred embodiments of the invention follows.

Figure 1:
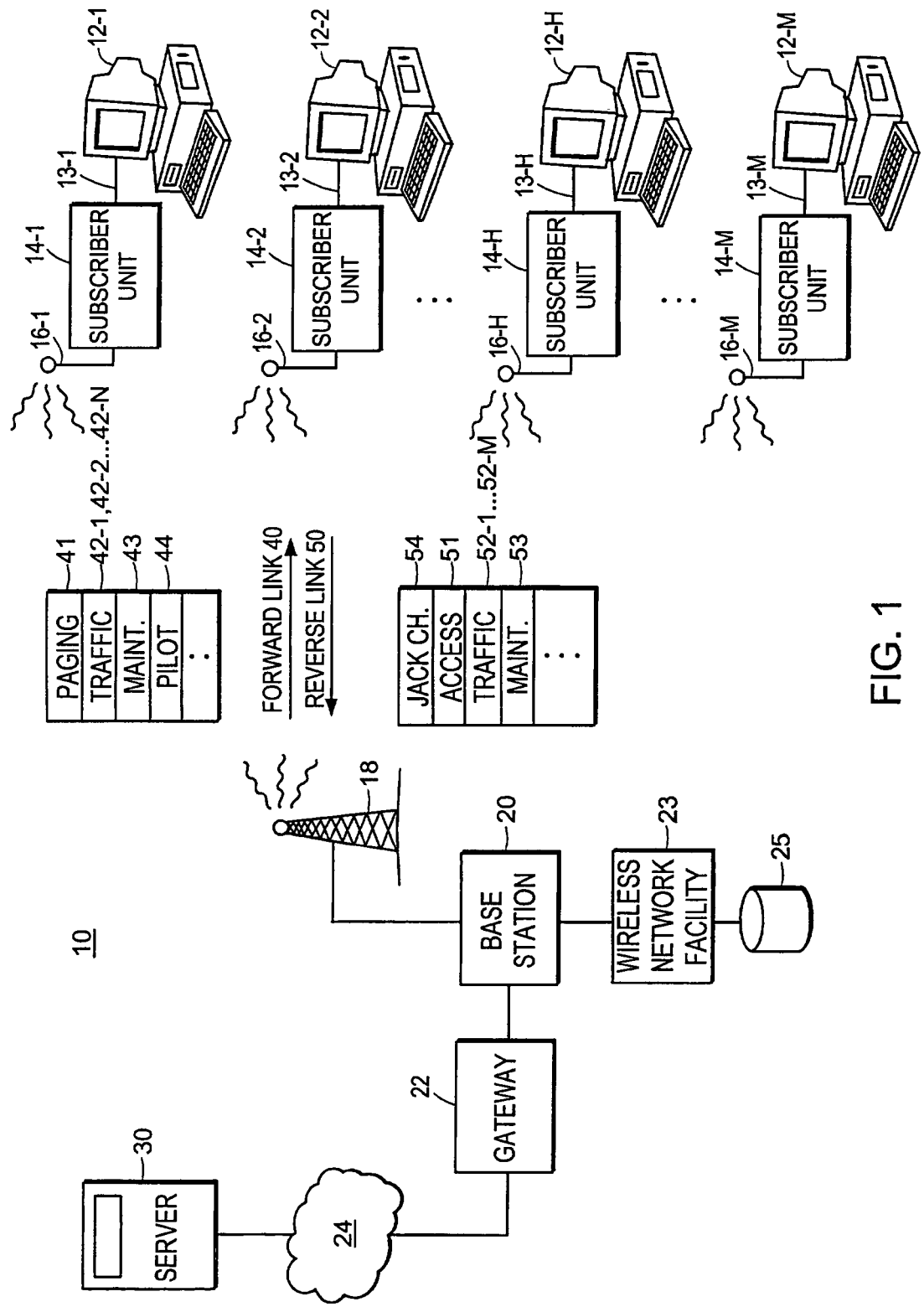
FIG. 1 is a block diagram illustrating a joint acknowledgment channel in a wireless communication system according to the principles of the present invention.

FIG. 1 is a block diagram illustrating a communication system supporting the transmission of data information over multiple allocated wireless communication channels. As in many wireless communication systems, users compete for wireless bandwidth allocation. Hence, it is desirable that the wireless communication 10 is optimized for data throughput and, in certain applications, hi-speed bursts of data throughput.

Certain aspects of the present invention are based on the recognition that some messages transmitted over a wireless link are redundant to the extent that specific protocols are repeatedly used to communicate data information between a base station and each of multiple subscriber units. For example, one aspect of most network protocols involves transmitting acknowledgment messages in a return communication path to indicate the status of transmitted and received data between network devices such as a server and a client. This type of feedback in a reverse communication path ensures that messages are properly received at a target device, increasing overall link quality between a transmitter and receiver device.

Consider packet-switched systems such as those based on TCP/IP (Transfer Control Protocol/Internet Protocol). During a typical network communication session, acknowledgment and similar types of link maintenance messages are repeatedly generated as encoded data packets that are transmitted as network messages along with corresponding data information messages that are used at an application layer of a network session. Considerable processing power at a target device is often necessary to quickly distinguish link maintenance messages from actual data payload messages. It is preferred that processing time of a message at an intermediate routing device is minimized so that the message can be transmitted to a corresponding target in as little time possible.

According to one aspect of the present invention, messages transmitted over a wireless link from a subscriber unit 14 are analyzed to determine their content prior to transmission. Selected messages of a particular type are intercepted and encoded for transmission over a structured channel to a target device in lieu of being transmitted as a random data packet that must be analyzed at multiple layers to determine its content. In a specific application, the structured channel can be adapted to transmit common message types such as acknowledgment messages indicating whether data information is properly received and decoded at a target device such as a server.

According to the following description, communication system 10 is described as a wireless communication link such as a CDMA radio channel utilizing shared channel resources. However, it should be noted that the techniques described herein can be applied in other applications supporting shared access. For example, the principles of the present invention can be applied to other types of media such as telephone connections, computer network connections, cable connections, or other physical media to which allocation of resources such as data channels are granted on an as-needed basis.

As shown, communication system 10 includes a number of Personal Computer (PC) devices 12-1, 12-2, . . . 12-h, . . . 12-m, corresponding subscriber units or terminals 14-1, 14-2, . . . 14-h, . . . 14-m, and associated directional antenna devices 16-1, 16-2, . . . 16-h, . . . 16-m. Centrally located equipment includes a base station antenna 18, and a corresponding base station 20 that includes high speed processing capability.

Base station 20 provides connections to and from a network gateway 22, network 24 such as the Internet, and network file server 30. Communication system 10 is preferably a demand access, point to multi-point wireless communication system such that the PC devices 12 can transmit data to and receive data from network server 30 through bi-directional wireless connections implemented over forward links 40 and reverse links 50. That is, in the point to multi-point multiple access wireless communication system 10 as shown, a given base station 20 typically supports communication with a number of different subscriber units 14 in a manner which is similar to a cellular telephone communication network. Accordingly, system 10 can provide a framework for a CDMA wireless communication system where digital information is relayed on-demand between multiple mobile cellular users and a hardwired network 24 such as the Internet.

PC devices 12 are typically laptop computers, handheld units, Internet-enabled cellular telephones, Personal Digital Assistant (PDA)-type computers, digital processors or other end user devices, although almost any type of processing device can be used in place of PC devices 12. One or multiple PC devices 12 are each connected to a respective subscriber unit 14 through a suitable wired connection such as an Ethernet-type connection via cable 13.

Each subscriber unit 14 permits its associated PC device 12 access to the network file server 30. In the reverse link 50 direction, that is, for data traffic transmitted from the PC 12 towards the server 30, the PC device 12 transmits an Internet Protocol (IP) level network packet to the subscriber unit 14. The subscriber unit 14 then encapsulates the wired framing, i.e., Ethernet framing, with appropriate wireless connection framing so that data packets can be transmitted over the wireless link of communication system 10. Based on a selected wireless protocol, the appropriately formatted wireless data packet then travels over one of the radio channels that comprise the reverse link 50 through subscriber unit antenna 16 to base station antenna 18. At the central base station location, the base station 20 then extracts the radio link framed data packets and reformats the packets into an IP format. The packets are then routed through gateway 22 and any number or type of networks 24 to an ultimate destination such as a network file server 30. In one application, information generated by PC device 12 is based on a TCP/IP protocol. Consequently, a PC device 12 has access to digital information such as web pages available on the Internet. It should be noted that other types of digital information can be transmitted over channels of communication system 10 based on the principles of the present invention.

Data can also be transmitted from the network file server 30 to the PCs 12 on a forward link 40. In this instance, network data such as an Internet Protocol (IP) packets originating at the file server 30 travel on the network 24 through the gateway 22 to eventually arrive at the base station 20. As previously discussed for reverse link data transmissions, appropriate wireless protocol framing is then added to raw data such as IP packets for communication of the packets over a wireless forward link 40. The newly framed packets then travel through the antenna 18 and 16 to the intended receiver subscriber unit 14. An appropriate target receiver subscriber unit 14 decodes the wireless packet protocol layer, and forwards the packet or data packets to the intended PC device 12 that performs IP layer processing.

A given PC device 12 and file server 30 can therefore be viewed as the end points of a duplex connection at the IP level. Once a connection is established between the base station processor 20 and corresponding subscriber unit 14, a user at the PC device 12 can then transmit data to and receive data from the file server 30 on an as-needed basis.

Reverse link 50 optionally includes different types of logical and/or physical radio channels such as a JACK (Joint Acknowledgment) channel 54, an access channel 51, multiple traffic channels 52-1, . . . 52-m, and a maintenance channel 53. The reverse link access channel 51 is used by the subscriber units 14 to request use of traffic channels by the base station 20. For example, traffic channels carrying data packets can be assigned to a user on an as-needed basis. The assigned traffic channels 52 in the reverse link 50 then carry payload data from the subscriber unit 14 to the base station 20. Notably, a given link between the base station 20 and subscriber unit 14 can have more than one traffic channel 52 assigned to it.

Maintenance channel 53 carries maintenance information such as synchronization and power control messages to further support transmission of digital information over both the reverse link 50 and forward link 40.

JACK channel 54 is a shared and structured reverse link channel for transmitting messages from a subscriber unit 14 to the base station 20. Preferably, the JACK channel 54 is partitioned into time slots of equal duration and is structured to have a specified bit mapping. According to how the bits in a time slot are set by an assigned subscriber unit 14, the subscriber unit 14 communicates messages to the base station. This aspect of the present invention is described in more detail later in the specification.

The forward link 40 can also include a paging channel 41, which is used by the base station 20 to inform a subscriber unit 14 of general information such as that one or multiple forward link traffic channels 52 have been allocated to it for the transmission of data. Additionally, the channel is used to inform the subscriber unit 14 of allocated traffic channels 52 in the reverse link 50 direction. Traffic channels 42-1 ... 42-n on the forward link 40 are then used to carry payload information from the base station 20 to a corresponding target subscriber unit 14.

Additionally, maintenance channels 43 carry synchronization and power control information on the forward link 40 from the base station processor 20 to the subscriber units 14.

The traffic channels 42 on the forward link 40 can be shared among multiple subscriber units 14 based on a Time Division Multiplexing scheme. Specifically, a forward link traffic channel 42 is optionally partitioned into a predetermined number of periodically repeating time-stamped slots for transmission of data packets from the base station 20 to multiple subscriber units 14. It should be understood that a given subscriber unit 14 can, at any instant in time, have multiple time slots or no time slots assigned to it. In certain applications, an entire time-slotted forward or reverse link traffic channel is assigned for use to a particular subscriber unit 16.

Figure 2:
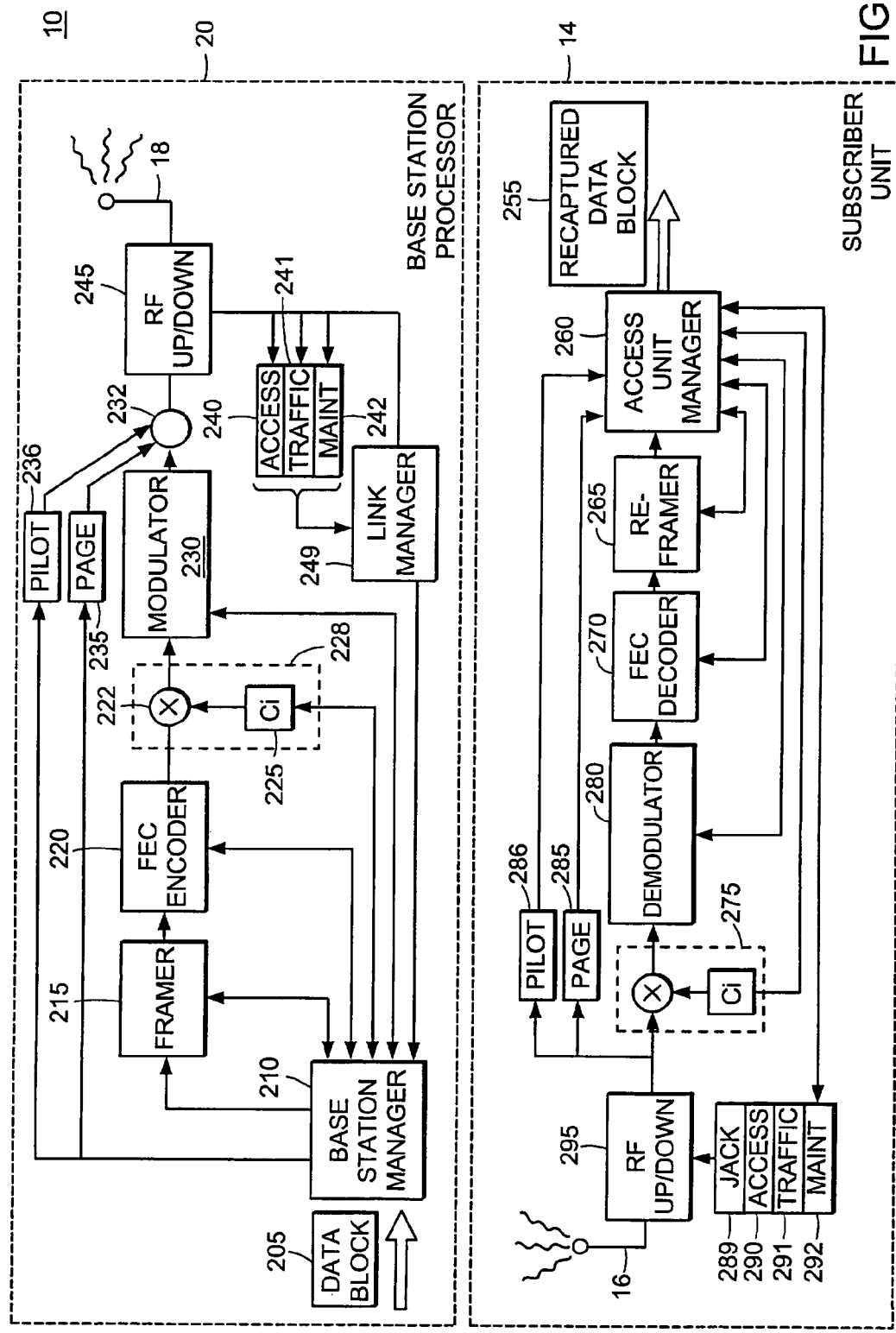
FIG. 2 is a detailed block diagram of a transmitter and receiver circuit for communicating data over a wireless link according to the principles of the present invention.

FIG. 2 is a block diagram illustrating a combination of hardware and software components for supporting a data block transfer over a wireless link according to the principles of the present invention. Although base station 20 as shown includes details of a transmitting device and subscriber unit 14 as shown includes details of a receiving device, both the base station 20 and subscriber unit 14 include complementary hardware and software as shown so that they can both transmit and receive wireless data information.

One aspect of the present invention involves transmitting data block 205 over a wireless link so that it can be reconstructed as recaptured data block 255 at subscriber unit 14. As shown, data block 205 is presented to base station manager 210 for transmission over wireless communication system 10. In one application, data block 205 comprises digital data transmitted by server 30 through network 24 and gateway 22 to base station processor 20. This data block 205 is routed to base station processor 20 for transmission to a target receiver subscriber unit 14 of communication system 10.

As previously mentioned, data block 205 can be a block of TCP/IP data packets encapsulating, for example, web page information bound for a target receiver subscriber unit 14. It should be noted that portions of data block 205 can be transmitted over the data channels to a target receiver even though only a portion of the data block 205 is received at base station processor 20. More specifically, parts of a data block can be transmitted over the wireless channels as such data is received at base station 20.

In some instances it is undesirable to transmit an entire data block in a serial manner over a single dedicated traffic channel. Such a technique can be ineffective for transmitting data if the throughput rate of the traffic channel link is low and the block of data to be transmitted is very large. It is preferable to transmit relatively large blocks of data in as little time possible while still making efficient use of wireless communication system 10. Thus, multiple traffic channels 42 are often allocated for use by a particular subscriber unit 14 for high-speed data transfers from the base station 20 to a target subscriber unit 14.

Data block 205 is preferably reduced into manageable chunks so that it can be transmitted piecewise over multiple channels to a target receiver subscriber unit 14. If only a single limited-bandwidth wireless channel were utilized for such a data transfer as mentioned, large data blocks 205 might otherwise be slowed by a bottleneck of a single channel unable to support a high throughput.

Data block 205 is presented to framer 215 that optimally reduces the size of data block 205 by dividing it into sub-packets or sub-blocks of data based on operating parameters of communication system 10. A number of bytes in each frame is not of particular importance to the present invention since the optimal division of a data block 205 depends on many parameters of communication system 10.

In any event, framed data is fed to forward error correction (FEC) encoder 220. The FEC encoder 220 adds bit information to the framed data to permit error detection at a target subscriber unit 14. Based on redundancy, the forward error correction encoding ensures that data is accurately received at a target receiver subscriber unit 14. Any number of FEC encoder types can be used such as BCH codes, Block codes, turbo codes, turbo product codes and the like.

An FEC encoded frame is then forwarded from FEC encoder 220 to a cover sequence circuit 228 that applies a cover sequence, $C_i$, corresponding to a traffic channel over which the data is to be transmitted. The cover sequence circuit comprises code generator 225 and mixer 222.

A cover sequence $C_i$ can be any suitable sequence. One class of such sequences are long pseudo-random noise (PN) codes. In this instance, a cover sequence is applied by modulo-2 multiplication of the cover sequence $C_i$ with FEC encoded frame data. A cover sequence can also be other near-orthogonal sequences that scramble encoded data. Preferably, a cover sequence will scramble the data sufficiently and cause an FEC decoder to fail in the decoding process if an incorrect cover sequence is applied at a receiver other than a target subscriber unit 14. This ensures separation of traffic channels such as those supported in a code division multiple access (CDMA) communication system.

The signal output from cover sequence circuit 228 is then fed to modulator 230. A modulation type is impressed upon this signal at modulator 230 as selected by base station manager 210. Modulation types can be any suitable type such as BPSK (binary phase shift keying), QPSK (quadrature phase shift keying), 8-psk, up to n-psk. A type of modulation to be used in the transmission of a data packet 205 depends on operating parameters of the wireless communication system 10.

Modulated signals generated by modulator 230 are then fed to summer circuit 232. In addition to the modulated traffic channels as previously discussed, a pilot channel 236 and paging channel 235 are fed to summer circuit 232. Similar hardware and software as that previously discussed for the traffic channel can be used to generate signals for the pilot channel 236, paging channel 235 and other forward link channels.

RF up/down converter 245 is then used to transmit the information over wireless channels via antenna 18. Accordingly, data information is transmitted over forward link 40 channels to one or multiple subscriber units 14 of wireless communication system 10. More specifically, multiple traffic channels are 42 generated at base station 20 to carry sub-blocks of data block 205 to a target receiver subscriber unit 14.

It should be noted that components of base station 20 can be duplicated in a subscriber unit 14 to support the generation of multiple traffic or paging channels. More specifically, multiple traffic channels can be generated at base station 20 to carry sub-blocks of data block 205 to a target receiver subscriber unit 14.

Subscriber unit 14 of FIG. 2 includes a block diagram of components for receiving data transmitted from base station 20. Antenna 16 receives wireless signals that are processed by RF up/down converter 295. Multiple assigned traffic channels are monitored and decoded for data directed to a corresponding subscriber unit 14.

Each subscriber unit 14 preferably includes a cover sequence circuit 275, a demodulator 280, an FEC decoder 270, a re-framer 265 and a subscriber unit manager 260. This combination of components is used to monitor, receive and decode data information as it is received on a particular traffic channel.

As shown, cover sequence circuit 275 is used to identify data transmissions having a particular cover sequence of a CDMA channel. The signal generated from cover sequence circuit 275 is then fed to demodulator 280 where it is demodulated according to a type of modulation used in transmission of the data information. FEC decoder 270 is then used to verify that data information is properly received without errors based on a forward error correction code. Finally, re-framer 265 processes the received data for recapturing sub-blocks or raw data of original data block 205. Received sub-blocks are recombined at access unit manager 260 to produce recaptured data block 255. Preferably, recaptured data 255 block is identical or near-identical to original data block 205. In applications supporting the transfer of IP data packets, the raw data of recaptured data block 255 is forwarded to a corresponding PC device 12. As mentioned, the format of this information can be based on, for example the TCP/IP network protocol.

In a similar but reverse manner as previously described, messages generated at a subscriber unit are transmitted at the base station, where they are demodulated, decoded and otherwise processed.

Figure 3:
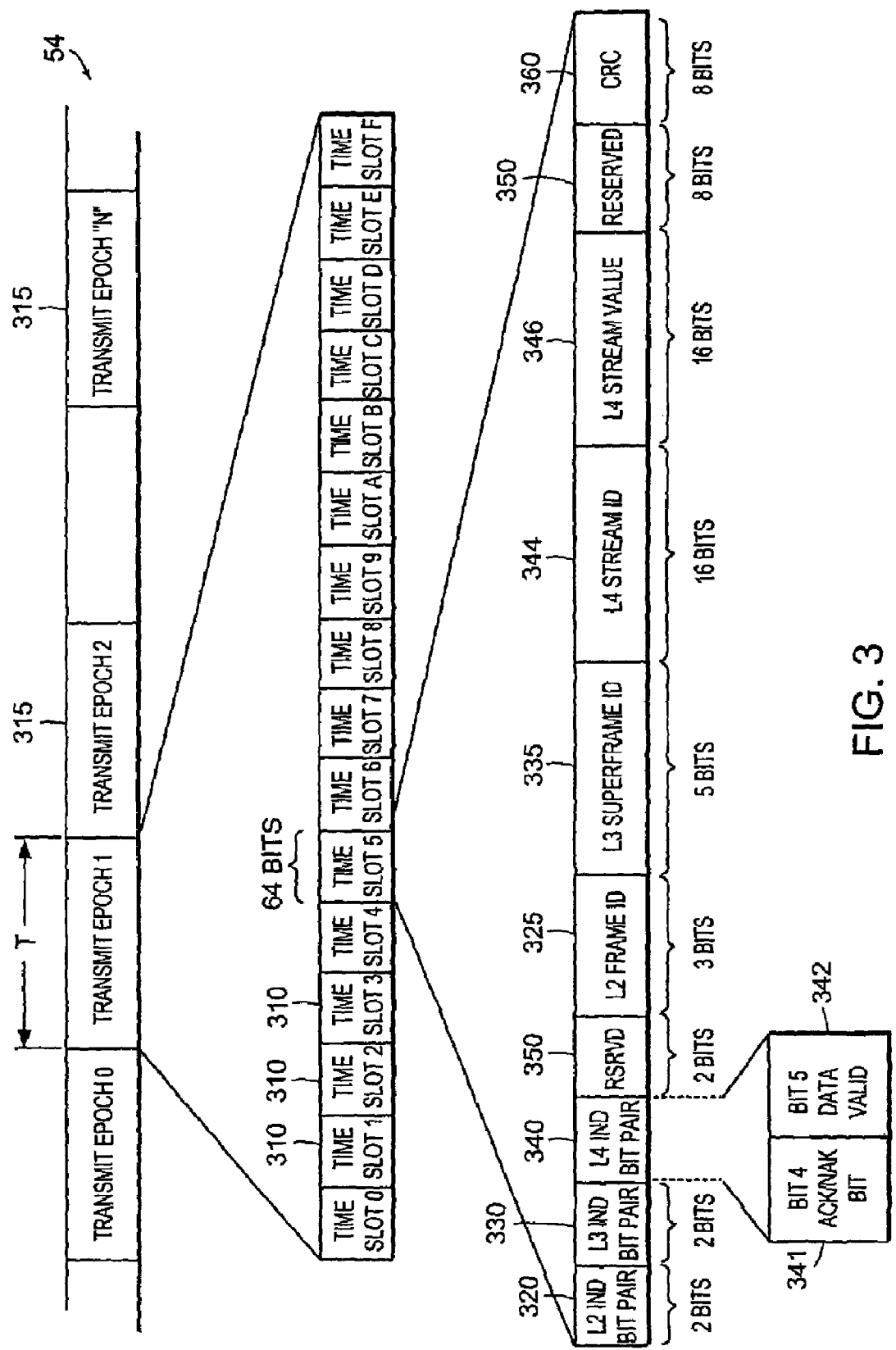
FIG. 3 is a timing diagram of a time-slotted joint acknowledgment channel according to the principles of the present invention.

FIG. 3 is a JACK channel (Joint Acknowledgment channel) illustrating an exemplary bit mapping according to the principles of the present invention. Preferably, JACK channel 54 is a time-slotted channel for carrying messages such as feedback messages to base station 20 over a shared reverse link 50 channel.

Because the link between a server 30 and PC 12 includes a wireless forward link channel 40, there is a need in certain applications to support communications from the PC device 12 to server 30 over a reverse link channel 50. A portion or all of such communications are preferably supported by JACK channel 54. It should be noted that JACK channel 54 is optionally a minimal link supporting sporadic communications other than feedback messages or acknowledgment messages from a subscriber unit 14 to base station 20. It also should be noted that one or multiple time-slotted channel such as JACK channel 54 can be established in a forward link 40 for data payload communication from a subscriber unit 14 to base station 20. More specifically, the principles of the present inventions are not limited to applications such as a reverse link channel of a CDMA communication system.

Although not shown in FIG. 3, another JACK channel can be supported in a forward link 40 to support sporadic messages generated in a forward link direction to a particular subscriber unit 14.

As previously discussed, wireless communication system 10 can support short duration, high-speed data bursts on forward link channels from one or multiple base stations 20 to subscriber units 14. In one application, the data information transmitted over the forward link 40 includes digitally encoded data blocks 205 such as web page information to PC device 12. In this instance, the JACK channel 54 is used to carry acknowledgment messages to indicate receipt of the web page information.

A network session can be established by sending a SYN message from PC device 12 to server 30. This is typically how a session is established between a client such as PC device 12 requesting web page information and a server 30 providing the web page information. In response to receipt of a SYN message at server 30, an ACK message is thereafter generated and transmitted from server 30 to corresponding PC device 12 to indicate that the SYN messages was received by server 30. In furtherance of the TCP/IP protocol, the PC device 12 after receiving the ACK would then send a return ACK message to server 30 indicating that the ACK was received. Consequently, a network session is established to transmit data such as web page information from server 30 to corresponding PC device 12.

As previously discussed, web page information is then transmitted from server 30 over assigned forward link traffic channels 42. A portion of JACK channel 54 is allocated for use by the corresponding subscriber unit 14 to transmit, for example, sporadically generated ACK messages in the reverse link 50 direction to server 30. As is known, these subsequent and sporadically generated ACK messages transmitted by the subscriber unit 14 are used to acknowledge receipt of data information at subscriber unit 14 or PC device 12 for a particular established network session.

JACK channel 54 is preferably structured as multiple periodically repeating time-slots 310, each of which is used to transmit 64 bits of information encoded via symbols from a subscriber unit 14 to the base station 20. Each subscriber unit 14 preferably synchronizes itself with base station 20 based on a forward link channel so that a subscriber unit 14 can properly transmit data in an assigned time slot 310. Precise synchronization with base station 20 ensures that the subscriber units 14 do not interfere with each other while transmitting in adjacent time slots 310 on the reverse direction JACK channel 54.

Combined, the total duration of one cycle of time slots 0 ... F is 26.6 mS for encoding 1024 bits of data information. One cycle of periodically repeating time slots 310 is also known as an epoch 315 of time duration, T. Of course, a duration of a time slot 310 and number of bits encoded in a time slot 310 can be adjusted to suit a particular application.

In an illustrative application where system 10 supports wireless CDMA communications, JACK channel 54 is modulated via BPSK (Binary Phase Shift Keying) and framed with a ½ rate FEC (Formal Error Correction) code. As mentioned, appropriate equipment at base station 20 is used to receive messages encoded in each of the multiple time slots 310. Of course, JACK channel 54 can be modulated and FEC coded at different rates. For example, different FEC codes can be used for transmission of information in different time slots 310. Likewise, communication system 10 is optionally implemented so that subscriber units 14 each can transmit messages in a time slot 310 based on a different or assigned modulation rate.

The shared JACK channel 54 is optionally structured so that bits in a time slot 310 have a specified meaning. More specifically, certain bits such as bit 4 and bit 5 in a time slot 310 of the shared JACK channel 54 as set by a subscriber unit 14 can be used to communicate a particular message to base station 20. For instance, a single bit such as ACK/NAK bit 341 (bit 4) that is transmitted in a time slot 310 can be used to transmit a message to the base station 20 regarding a particular network session, where the setting of the bit itself indicates a message-type.

In an application where the single bit is an ACK/NAK bit 341 (Acknowledgment/No Acknowledgment bit), a logic one can indicate that a message is an "acknowledgment" message while a logic zero can indicate that a message is a "no acknowledgment" message. Thus, a base station 20 transmitting information over a forward link 40 channel to a subscriber unit 14 can be provided feedback in a reverse link 50 via messages transmitted on the JACK channel 54.

In certain applications, the messages transmitted in a time slot 310 of the JACK channel 54 can be considered substitute messages in some respects because an 'ACK' message, e.g., self-contained network packet as originally transmitted by a PC device 12, is optionally intercepted and converted by a subscriber unit 14 into a newly encoded message that is transmitted in a time slot 310 of the JACK channel 54.

In an application where a specific message is not transmitted in every time slot 310 from the subscriber unit 14 to the base station 20, i.e., an acknowledgment message is not sent every periodically repeating time slot 310, a complementary data valid bit 342 (bit 5) can be transmitted in a time slot 310 to indicate that the setting of a corresponding ACK/NAK bit 341 is meaningless. For example, a complementary data valid bit 342 such as bit 5 can be set as a logic one or zero to indicate that the ACK/NAK bit 341 is valid or otherwise invalid, respectively. In this way, two bits such as bits 4 and 5 of a time slot 310 can be used to communicate a particular message to the base station 20. When the complementary data valid bit 342 is a logic zero, the setting of the ACK/NAK bit 341 is meaningless. Thus, no message is being sent at least for that particular time slot 310. Accordingly, it is possible for an assigned subscriber unit 14 not to transmit a message to the base station 20 every successive periodically repeating time slot 310 of the shared reverse link JACK channel 54.

Based on this method, a message that would otherwise be transmitted along with other data payload messages on a reverse link traffic channel 52 can be converted and transmitted as a substitute message using one or two bits in a time slot 310 of the shared reverse link JACK channel 54. This aspect of the present invention is particularly advantageous in applications where limited resources are available for transmitting data information in a reverse link channel because a message can be transmitted using fewer bits. More specifically, a self-contained switched network packet that would otherwise include many more bits to encode an acknowledgment message is substantially reduced in size and transmitted as a substitute message in a time slot 310 of the JACK channel 54.

In one application, the L4 (layer 4) indicator bit pair 340 as previously described is used to encode layer 4 ACK messages for a particular network session between PC device 12 and server 30. Notably, certain fields of a time slot 310 in addition to the L4 indicator bit pair 340 as described above can be allocated for encoding additional details of a corresponding layer 4 acknowledgment message. For example, 16 bits of a time slot 310 can be allocated to encode an L4 stream identification tag 344 identifying an established session for transmitting data between a PC device 12 and server 30. Another 16 bits of a time slot 310 can be allocated to encode an L4 stream value tag 34 identifying a network packet number being identified for the established session between subscriber unit 14 and server 30. Based on data in these fields of a time slot 310, a self-contained layer 4 ACK-type message generated by PC device 12 can be properly encoded and transmitted in a time slot 310 of JACK channel 54 to server 30 via a wireless link through base station 20. According to one aspect of the present invention, a self-contained switched network message as originally transmitted by PC device 12 is reconstructed at base station 20 based on the L4 acknowledgment data information in a time slot 310 of JACK channel 54. The ACK network message reconstructed at the base station 20 is then further transmitted over network 24 to target server 30.

Figure 7:
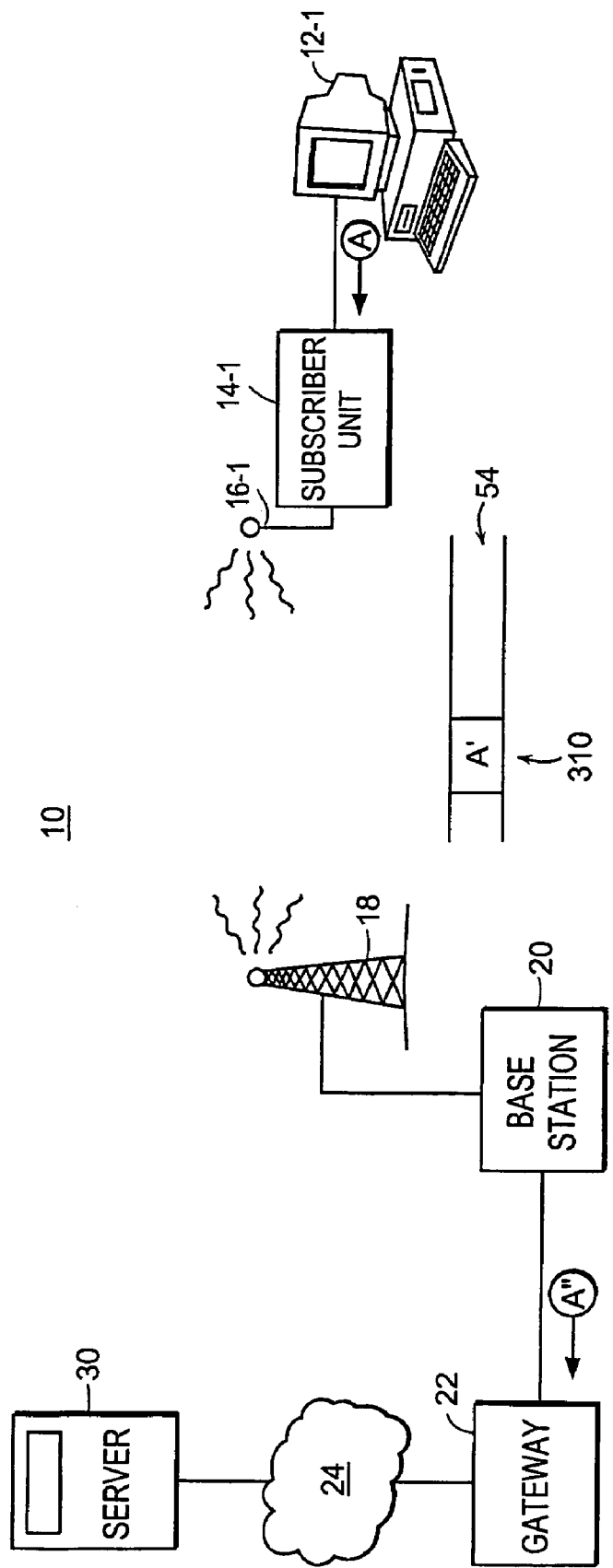
FIG. 7 is a block diagram illustrating how a feedback message at a subscriber unit is transmitted in a time slot of the joint acknowledgment channel, reformatted at a base station and further forwarded over a wired network to a target address according to the principles of the present invention.

FIG. 7 is a block diagram illustrating the generation of a network packet and how it is transformed into a substitute message according to the principle of the present invention. Message A including an Ethernet header is generated at, for example, PC device 12-1 and is bound for server 30 through JACK 54. As shown, Message A is transformed into a substitute message A' at subscriber unit 14-1 and is transmitted in a corresponding time slot 310 of JACK channel 54 channel. Message A' received at base station 20 in a time slot 310 is then reconstructed into a switched network packet message A" including an appropriate Ethernet header and is transmitted to server 30 in a substantially similar form as originally generated by PC device 12-1. In this way, a network message is efficiently forwarded over communication system 10 and the wireless link between subscriber unit 14 and base station 20 does not otherwise act as a bottleneck that inhibits data transfers.

Referring again to FIG. 3, the L4 stream ID (Identification) tag 344 is preferably a 16-bit number that identifies a particular L4 session between a PC device 12 and server 30 based on source/destination IP (Internet Protocol) address and source/destination port numbers. In other words, a source IP address (32 bits), destination IP address (32 bits), source port number (16 bits) and destination port number (16 bits) are hashed or reduced into a 16-bit L4 stream ID number that identifies a particular session. Both the subscriber unit 14 and base station 20 will track a session based on this 16-bit L4 stream ID tag 344. Accordingly, up to 65,534 individual sessions can be supported via this method of identifying a session type based on the 16-bit L4 stream ID tag 344. This excludes a use of 0000 hex and FFFF hex as L4 stream ID tags since they are reserved for special use.

When a session is established between PC device 12 and server 30, base station 20 and subscriber units 14 each track the new session based on the 16-bit L4 stream identifier tag 344. In one application, each new session is assigned a stream identifier tag 344 based on a one-up counter. For example, based on the detection of a new session established transmission between PC device 12 and server 30, a session is assigned a next available tag number at base station 20. A message is then transmitted to the subscriber unit to which session the newly assigned L4 stream identifier tag 344 pertains. In this way, both the base station 20 and subscriber unit 14 simultaneously track each session based on the 16-bit L4 stream identifier tag 344. Each newly detected and established session would be assigned a new L4 stream ID Tag 344 such as 0001 hex, 0002 hex, 0003 hex and so on as they are established.

Based on this method, a subscriber unit 14 intercepting an L4 ACK message generated by a corresponding PC device 12 identifies the session number to the base station 20 associated with the L4 ACK message based upon the source/destination IP address and source/destination port numbers. For instance, the 16-bit L4 stream ID tag 344 corresponding to the session is transmitted in a time-slot 310 in lieu of 96 bits of source/destination IP address and source/destination port numbers to identify the session to which the ACK message pertains. This aspect of the present invention is advantageous because 16 bits rather than 96 bits are used to identify a particular network session.

FIG. 6 is a table illustrating the Layer 4 stream ID tag 344 and corresponding session information that is tracked at both the base station 20 and subscriber unit 14 for a particular link between PC device 12 and server 30. As mentioned, subscriber unit 14 intercepts an L4 ACK message and notifies base station 20 of the session to which the message corresponds based on the L4 stream ID tag 344. Base station 20 can then reconstruct the originally transmitted L4 ACK message into a self-contained switched-network packet that is forwarded to server 30 based upon the corresponding source/destination IP address and source/destination port number as retrieved from the table. More specifically, base station 20 identifies the source/destination IP address and source/destination port numbers for an L4 ACK message received in a time slot 310 based upon entry in the table and reconstructs and forwards the network message accordingly.

Referring again to FIG. 3, the L4 stream value tag 346 is a 16-bit number identifying the position in the octet stream of the Layer 4 session that is being acknowledged by PC device 12. Thus, PC device 12 can acknowledge receipt of network packets according to the TCP/IP protocol based on network messages transmitted in the reverse link JACK channel 54. For example, the ACK message including the L4 stream value tag 346 can identify the number of messages properly received at PC device 12.

The L3 indicator bit pair 330 is similar to the L4 indicator bit pair 340 except the L3 indicator bit pair 330 is dedicated for layer 3 message processing. In a preferred embodiment, layer 3 message processing is used to verify that a data block 205 or superframe is properly received at a corresponding subscriber unit 14. In addition to the L3 indicator bit pair 330, Layer 3 ACK/NAK messages as transmitted in a time slot 310 over JACK channel 54 can include additional bits identifying the L3 superframe that is being acknowledged.

A superframe can be a data block 205 such as a TCP/IP network message that is reduced into segments or sub-blocks prior to transmission over forward link traffic channels to corresponding PC device 12 through subscriber unit 14. Each segment of a superframe or data block 205 is preferably sized so that it can be transmitted in a frame of the forward link 40 channel. When received at a corresponding subscriber unit 14, the segments are reassembled to form recaptured data block 255. The recaptured data block 255 or original network message is then forwarded to, for example, a target PC device 12 coupled to the subscriber unit 14. Meanwhile, an acknowledgment message is generated at the subscriber unit 14 for transmission to the base station 20 in the appropriate time slot 310 of the JACK channel 54 to acknowledge receipt of the received superframe. The superframe ID number 335 in a time slot 310 indicates the superframe or data block 205 being acknowledged by subscriber unit 14. Each superframe is sequentially numbered so that it can identified accordingly. Preferably, a 5-bit field is allocated for the superframe ID number 335 in a time slot 310.

The L2 indicator bit pair 320 is similar to the L4 indicator bit pair 340 except the L2 bit pair is instead dedicated to layer 2 message processing. Layer 2 processing assures that specific frames or segments of data information are properly received at a corresponding subscriber unit 14. As previously discussed, a frame is a block, sub-block or segment of a superframe of data transmitted over the forward link 40 to the subscriber unit 14. If a frame is not properly received due to data corruption caused by channel interference, the base station 20 must be notified so that the frame can be re-transmitted to the subscriber unit 14. According to the principles of the present invention, feedback messages in the appropriate time slot 310 of the JACK channel 54 prompt base station 20 to re-transmit an old frame of data or transmit a new frame of data.

The L2 frame ID tag 325 preferably identifies the frame number that is being acknowledged. For example, base station 20 initially transmits a specified frame number such as frame #0 to subscriber unit 14. The subscriber unit 14 will then need time to demodulate the received frame data and decode the symbols based of the FEC code. In the meantime, additional sequentially numbered frames of data information such as frames 1, 2, 3 ... are transmitted by base station 20 and received at a corresponding subscriber unit 14. The acknowledgment message transmitted in the reverse link JACK channel 54 indicates to the base station 20 whether a corresponding frame such as frame #0 should be resent. Notably, frame numbers for L2 frame ID tag 325 roll over to frame #0 again after frame #7 is sent to a particular subscriber unit 14.

Preferably, the L2 frame ID tag 325 includes multiple bits so that multiple frames can be identified in the process of transmitting/receiving frame data. For example, one frame ID tag can identify a frame being transmitted to a subscriber unit 14 while another frame ID tag can identify a received frame being processed at a subscriber unit 14.

Each time-slotted message 310 optionally includes a CRC (Cyclical Redundancy Check) packet 360 that is used for error-checking purposes. Based on a received CRC packet 360, the base station 20 can determine whether the 64 bits of data received in a particular time slot 310 has been corrupted during transmission. Reserved bits 350 in a time slot 310 are provided for the future growth.

If no forward link channels are assigned for use by a particular field unit and no time slots are available for allocation in the shared reverse link channel, information can be transmitted from the field unit to the base station via the assignment of reverse link traffic channels.

As previously discussed, the shared channel can be structured to encode network messages generated at different layers. Alternately, the shared channel can be an unstructured channel partitioned into time slots that carry generic payload data. For example, a network message or raw data can be encoded in a time slot of a shared channel where a receiver device must decode a data payload to determine a message type. Thus, the shared channel can carry any type of message and not just acknowledgment or feedback messages. For instance, a data payload transmitted in a time slot of the shared channel can be a maintenance message to support a corresponding link between the field unit and base station. Otherwise, such data can be transmitted over a traffic channel.

Another aspect of the present invention involves allocating additional bandwidth such as a reverse link traffic channel for transmitting a data message to the base station when throughput capacity afforded by an assigned time slot is exceeded. That is, if a field unit must transmit more information to the base station than is possible via an assigned time slot, at least part of a reverse link traffic channel is additionally assigned for use by the field to transmit information to the base station.

Figure 4:
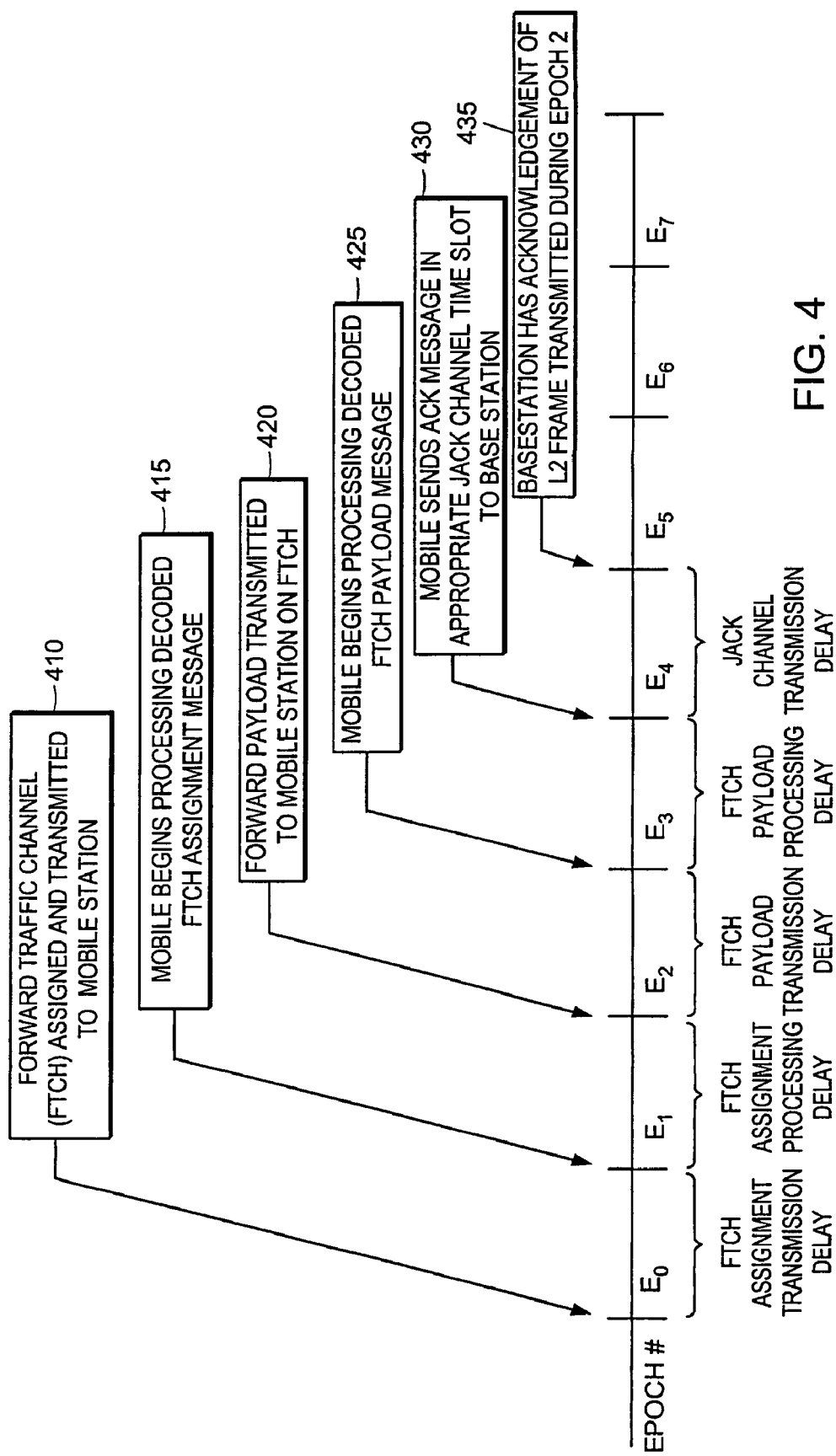
FIG. 4 is a timing diagram illustrating processing delays associated with the transmission of messages in a time slot of the joint acknowledgment channel according to the principles of the present invention.

FIG. 4 is a timing diagram illustrating the delays associated with the generation and transmission of a feedback message in the shared reverse link JACK channel 54. Generally, one or multiple forward traffic channels 42 are assigned for use by a particular subscriber unit 14 in step 410. A message indicating this new traffic channel assignment is transmitted by base station 20 to the corresponding subscriber unit 14. In following step 415, the subscriber unit 14 decodes the message to determine this new assignment of forward link 40 channels.

Based on this new assignment of traffic channels 42, the base station 20 transmits data information to the corresponding subscriber unit 14 in step 420. The subscriber unit then demodulates and decodes the received payload message in step 425 and, in a following step 430, transmits an ACK message over the appropriate JACK channel 54 time slot 310 to indicate whether the data is properly received. In step 435, base station 20 demodulates and decodes the ACK message received from the subscriber unit 14 in a corresponding time slot 310.

FIG. 5 is a JACK channel time slot assignment chart that is preferably maintained at both the base station 20 and subscriber unit 14. Table 500 illustrates JACK channel time slot usage for up to 4 epoch offsets. Table 500 is useful because it ensures that a subscriber unit 14 transmits a time-slotted message in the appropriate epoch and that base station 20 can identify to which forward link transfers the reverse link message pertains based upon a particular Epoch that is being processed. Accordingly, the subscriber units 14 can send a feedback message of previously received data information in the appropriate time slots 310 at a future point in time based on entries in the time slot assignment chart.

In one embodiment, table 500 at the base station 20 includes entries in each cell 510 indicating an ID Tag of a subscriber unit 14 that is allowed to transmit information during a given time slot 310. The table 500 maintained at the subscriber unit 14 includes a flag in each cell 510 indicating which time slots 310 have been assigned for its use. Thus, subscriber unit 14 can determine in which time slot 310 to transmit a corresponding message and base station 20 can identify from which subscriber unit 14 a message pertains.

In a preferred embodiment, time-slots 310 are implicitly assigned for use by subscriber unit 310 based on the allocation of forward link traffic channels 42. For example, a subscriber unit 310 is allocated use of a time slot 310 in the reverse link JACK channel 54 depending on which traffic channels 42 are used in the forward link 40 to transmit a data payload to the subscriber unit 14. More specifically, if the base station 20 transmits forward link messages on traffic channel #1, time slot #1 of the shared reverse link channel in a delayed Epoch is implicitly assigned for use by that particular subscriber unit 14 to transmit feedback information in a reverse link path of the JACK channel 54. Transmission of a message in a particular time slot 310 by a newly assigned subscriber unit 14, as mentioned, is delayed so that the subscriber unit 14 can receive and process data received on the newly assigned forward link channel 40 and respond appropriately in the reverse link time slot 310 of JACK channel 54. When utilized, this aspect of the present invention alleviates the need to transmit explicit messages from the base station 20 to subscriber units 14 indicating which time slot 310 is to be used for data messages.

Notably, a subscriber unit 14 can receive data information from the base station 20 on multiple forward link traffic channels 42 while providing corresponding feedback messages on multiple implicitly assigned time slots of the shared JACK channel 54.

In an alternate embodiment, one or multiple time slots 310 are explicitly assigned for use by a subscriber unit 14 via a corresponding message sent on a forward link channel 40 from the base station 20 to a subscriber unit 14 indicating which of multiple time slots will be assigned for use in the reverse link JACK channel 54 to carry feedback messages.

FIGS. 8-19 are flow charts based on SDL (Specification and Description Language) as promulgated by the ITU (International Telecommunication Union) specification z.100.

Figure 8:
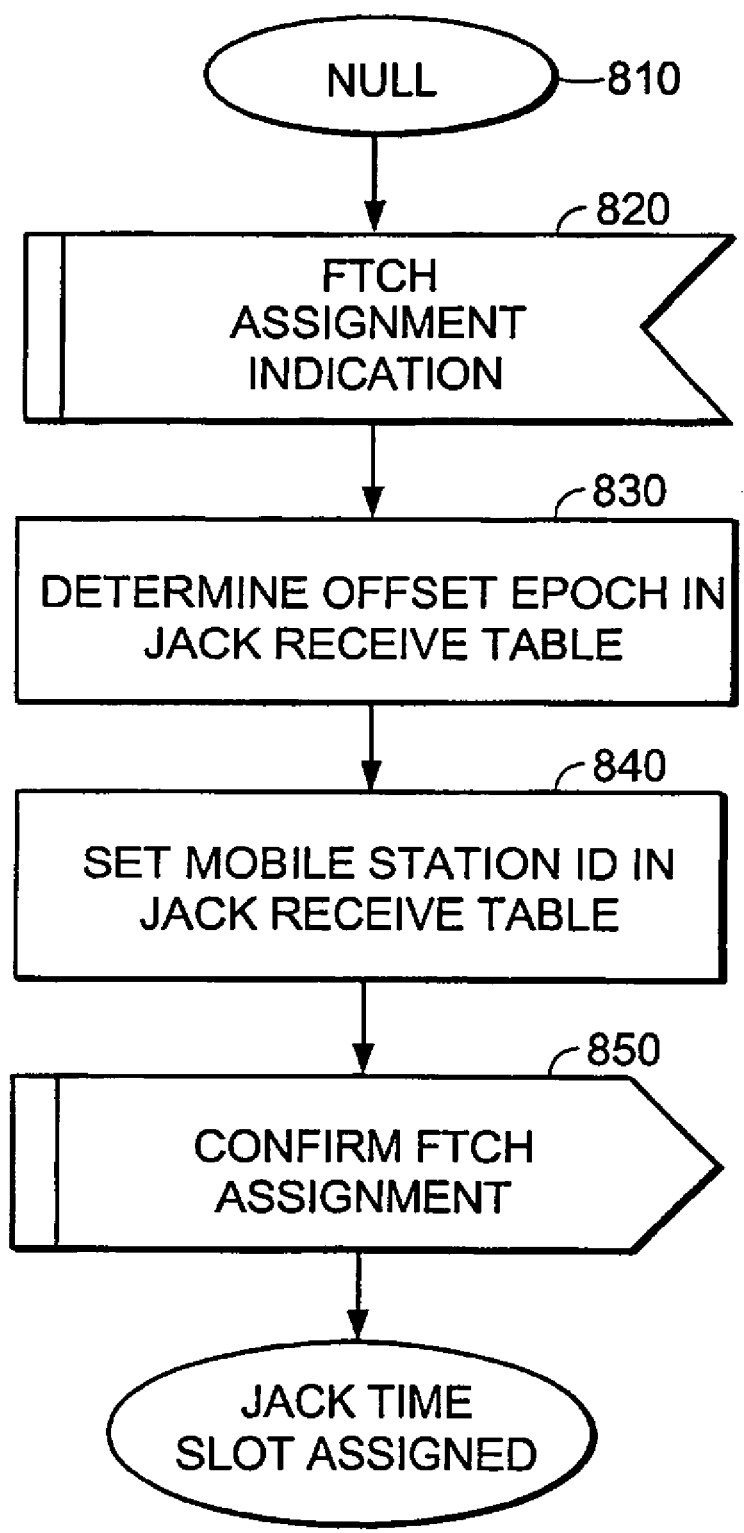
FIG. 8 is a flow chart illustrating the assignment of time slot usage of a joint acknowledgment channel according to the principles of the present invention.

FIG. 8 is a flow chart illustrating the assignment of JACK channel usage according to the principles of the present invention. Step 810 illustrates entry point of the subroutine as shown. In step 820, the resource manager in the base station 20 indicates that a particular forward traffic channel (FTCH) is assigned for use by a subscriber unit 14 and corresponding PC device 12. Based on this assignment of forward traffic channel, it is noted in which Epochs the traffic channels are assigned in step 830. Following in step 840, the subscriber unit 14 identification number is stored in the appropriate Epoch entries of the JACK receive table of FIG. 5. Finally, confirmation of the assigned traffic channel is sent to the resource manager of base station 20 in step 850.

Figure 9:
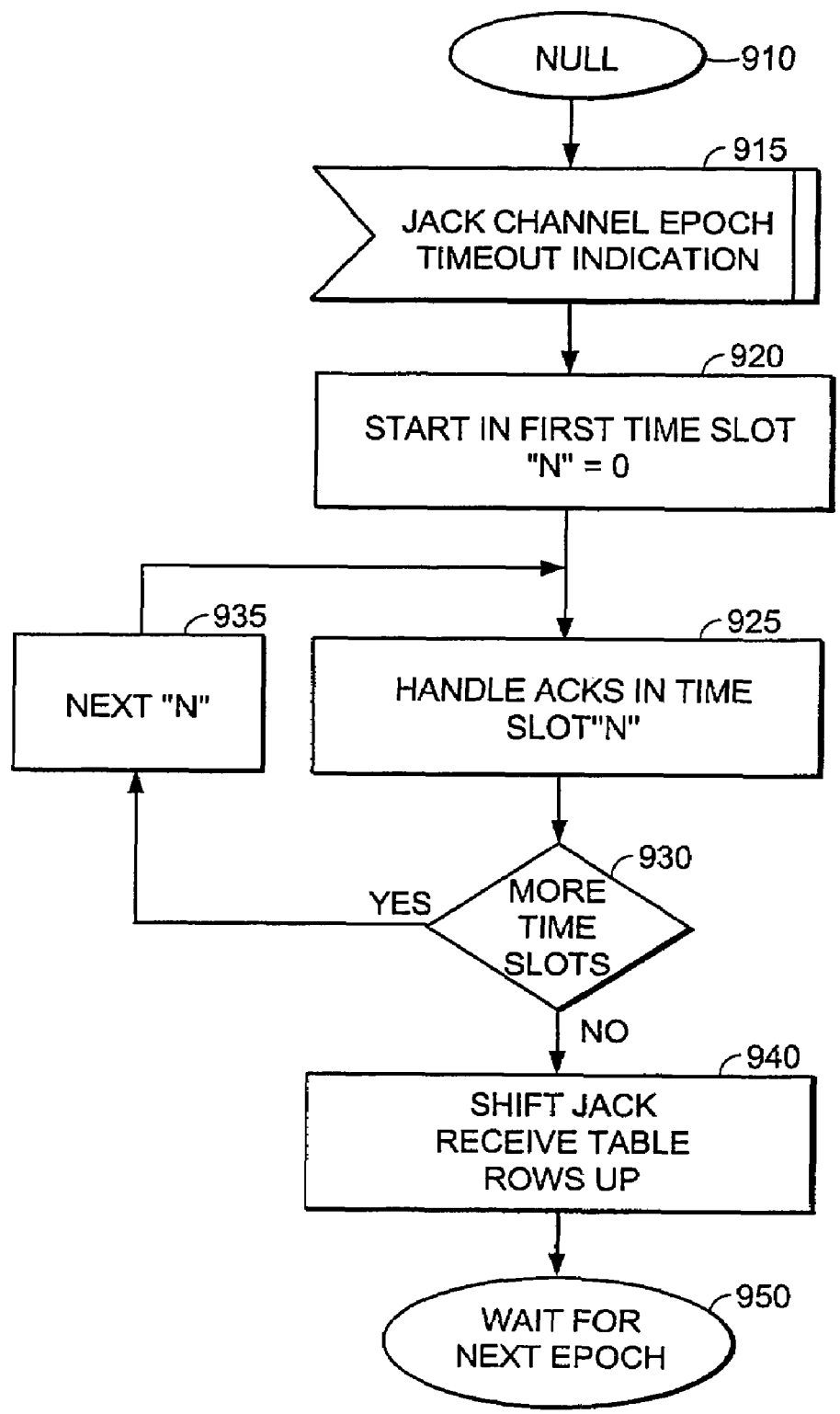
FIG. 9 is a flow chart illustrating how acknowledgment messages transmitted in a time slot of the joint acknowledgment channel are processed at a base station according to the principles of the present invention.
Figure 10:
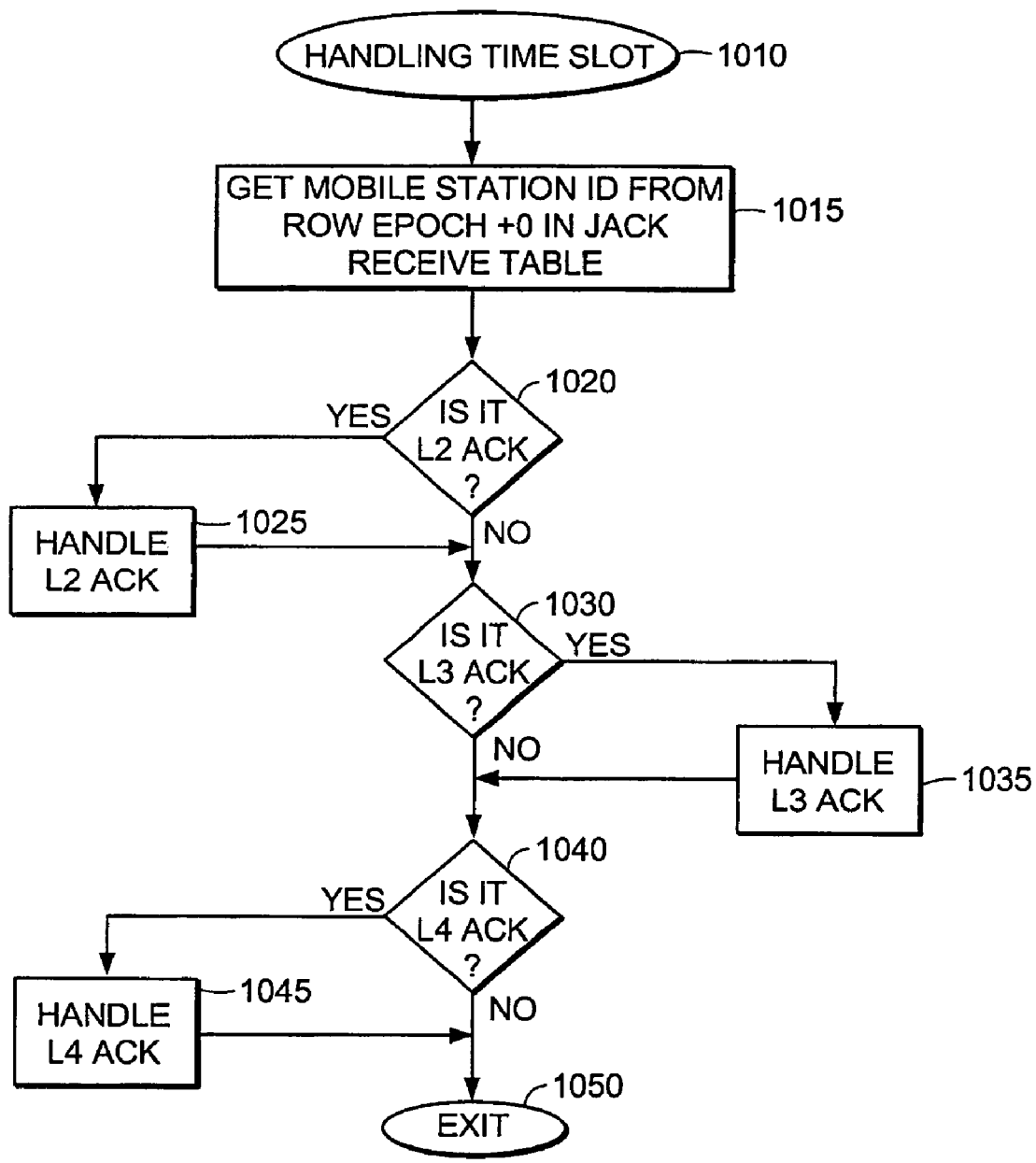
FIG. 10 is a flow chart illustrating how a time slot of the joint acknowledgment channel is processed according to the principles of the present invention.

FIG. 9 is a flow chart illustrating JACK channel processing at the base station according to the principles of the present invention. Step 910 shows the entry point into the subroutine. In step 915, an indication is received that the information for a particular Epoch, i.e., time slots 0-N, have been demodulated, decoded and the corresponding information is ready for further processing by the base station 20. The index counter, N, is set to zero in step 920 for processing data received in a time slot 310. Following in step 925, the information in a time slot N is processed. Step 925 is itself a subroutine as shown in FIG. 10. Step 930 and step 935 are part of a "for next" loop so that all time slots are appropriately processed. JACK receive table rows are then moved up in step 940 for processing in the following Epoch. Step 950 shows the end of this subroutine.

FIG. 10 is a flow chart illustrating more specific details of JACK channel time slot 310 processing according to the principles of the present invention. Step 1010 is an entry point into the subroutine. In step 1015, the subscriber unit ID corresponding to the time slot 310 is retrieved to identify from which subscriber unit 14 a message is received. Following in step 1020, it is determined whether an L2 ACK is encoded in the bits of a time slot. If so, the L2 ACK bits are processed accordingly in step 1025. Thereafter, it is determined in step 1030 whether an L3 ACK is encoded in the bits received in a particular time slot 310. If so, the L3 ACK bits are processed in step 1035. Finally, it is determined in step 1040 whether an L4 ACK is encoded in the bits received in a particular time slot 310. If so, the L4 ACK bits are processed accordingly in step 1045. After processing of layers, the subroutine ends in step 1050.

Figure 11:
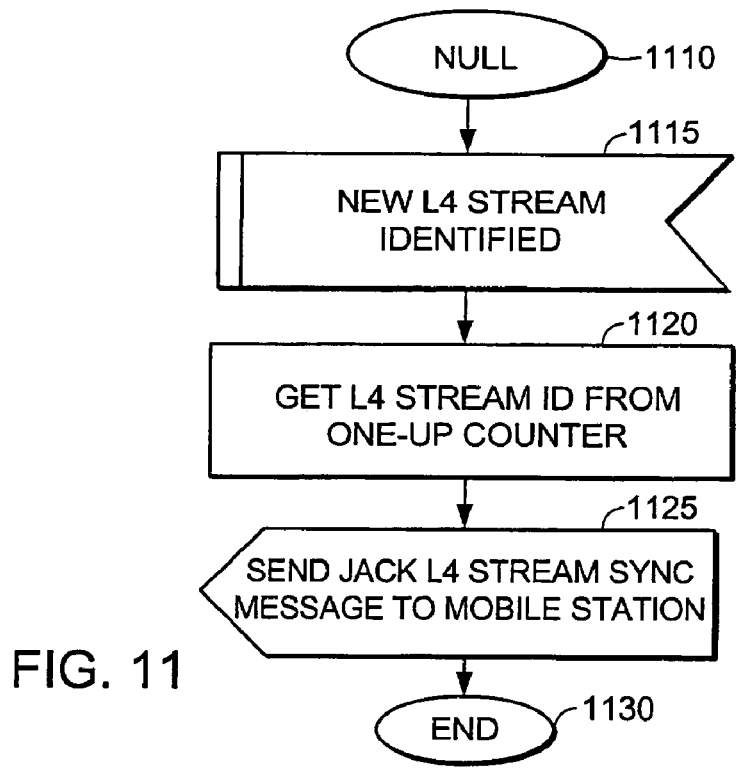
FIG. 11 is a flow chart illustrating how sessions are tracked for layer 4 message processing according to the principles of the present invention.

FIG. 11 is a flow chart illustrating how a session is tracked and identified for a link between a PC device 12 and server 30 according to the principles of the present invention. Step 1110 is an entry point into subroutine as shown. In step 1115, an L4 stream or session between a PC device 12 and a server 30 is identified at the base station 20. An L4 stream ID tag 344 is then assigned in step 1120 to the particular session based on a one-up counter. This information is stored in the table FIG. 6 to track established TCP sessions. Following in step 1125, a message is sent from the base station 20 to the corresponding subscriber unit 14 to indicate the L4 stream ID tag 344 that will be used to track a particular network session. The 32-bit source/destination address and 16-bit source/destination port number of the session are preferably sent to the corresponding subscriber unit 14 so that their tables match for tracking such sessions. Step 1130 shows the end of the subroutine.

Figure 13:
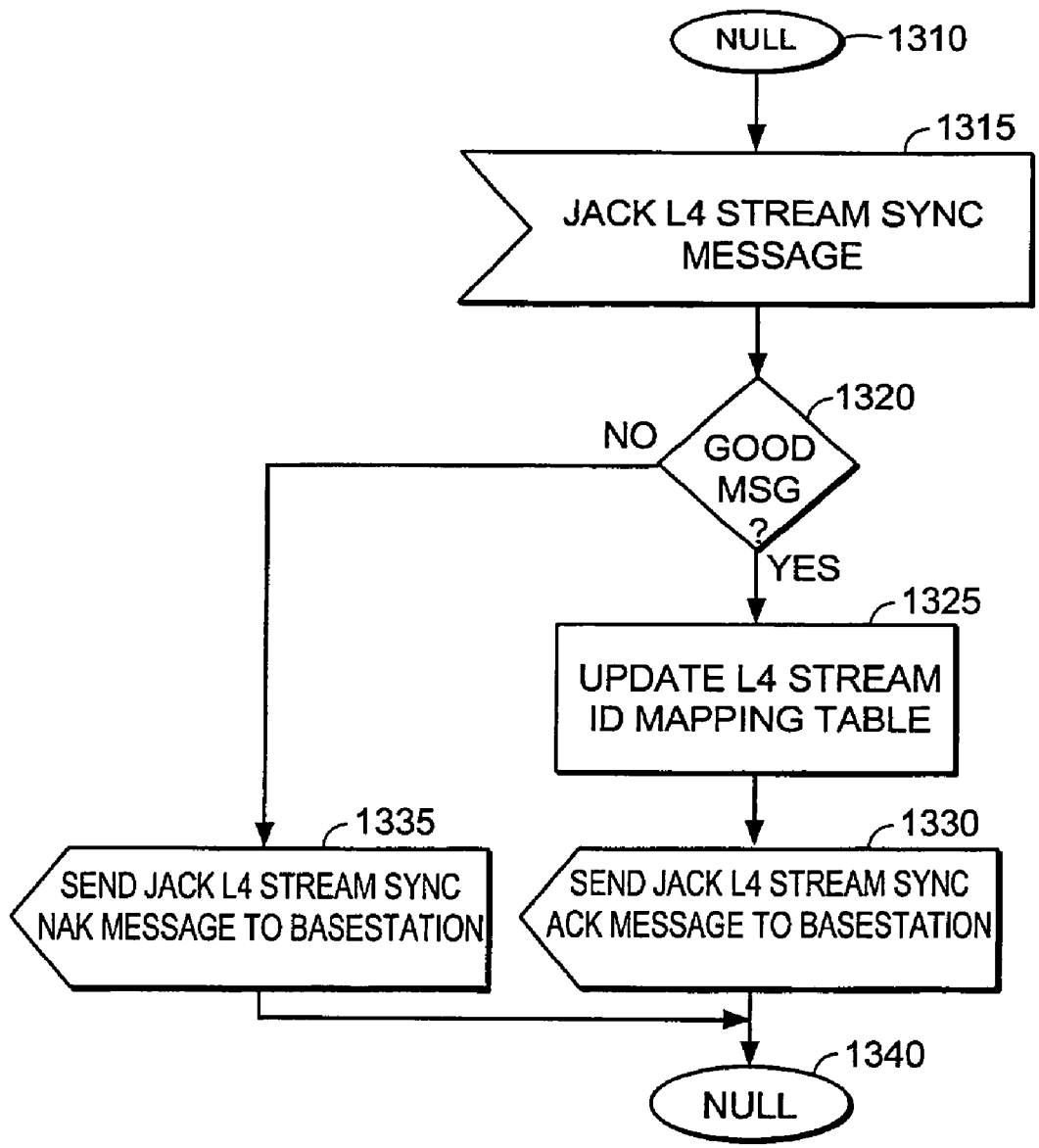
FIG. 13 is a flow chart illustrating how acknowledgment messages are processed at a subscriber unit according to the principles of the present invention.

FIG. 13 is a flow chart illustrating the acknowledgment of a session identification tag at a subscriber unit according to the principles of the present invention. Step 1310 shows the entry point of the subroutine. In step 1315, the stream sync message as recently discussed for the flow chart of FIG. 11 is received at the subscriber unit 14. It is then determined whether the message is properly received in step 1320. If not, a negative acknowledgment is generated and transmitted to the base station 20 in step 1335 indicating that the message was not properly received and the table maintained at the subscriber unit 14 cannot be properly updated. If stream sync message is properly received in step 1320, the stream ID and related information in mapping table of FIG. 6 is updated at the subscriber unit 14 to track a particular session in step 1325. Thereafter, an acknowledgment message regarding the update is sent to the base station 20 in step 1330. Step 1340 shows the end of subroutine.

Figure 12:
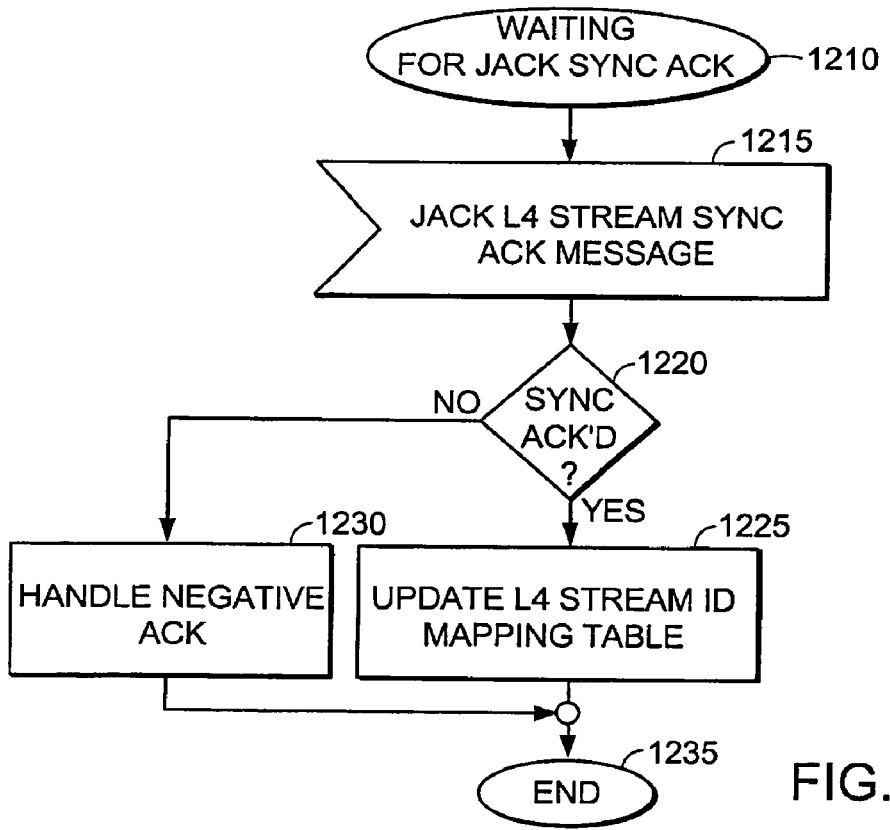
FIG. 12 is a flow chart illustrating how acknowledgment messages are processed according to the principles of the present invention.

FIG. 12 is a flow chart illustrating the acknowledgment of a session tag receipt at a subscriber unit according to the principles of the present invention. Step 1210 shows the entry point of the subroutine. In step 1215, the stream sync ACK message as generated by the subscriber unit 14 in the flow chart of FIG. 13 is received for further processing at base station 20. It is then determined in step 1220 whether the subscriber unit properly acknowledges the newly established session based on the message sent to the subscriber unit 14 as discussed in FIG. 11. If so, the L4 stream ID mapping at the base unit is updated in step 1225 to track a particular network session as shown in FIG. 6. If not, the negative ACK in step 1230 indicates that the JACK channel is not available for transmitting data. Step 1235 illustrates the end of this subroutine.

Figure 14:
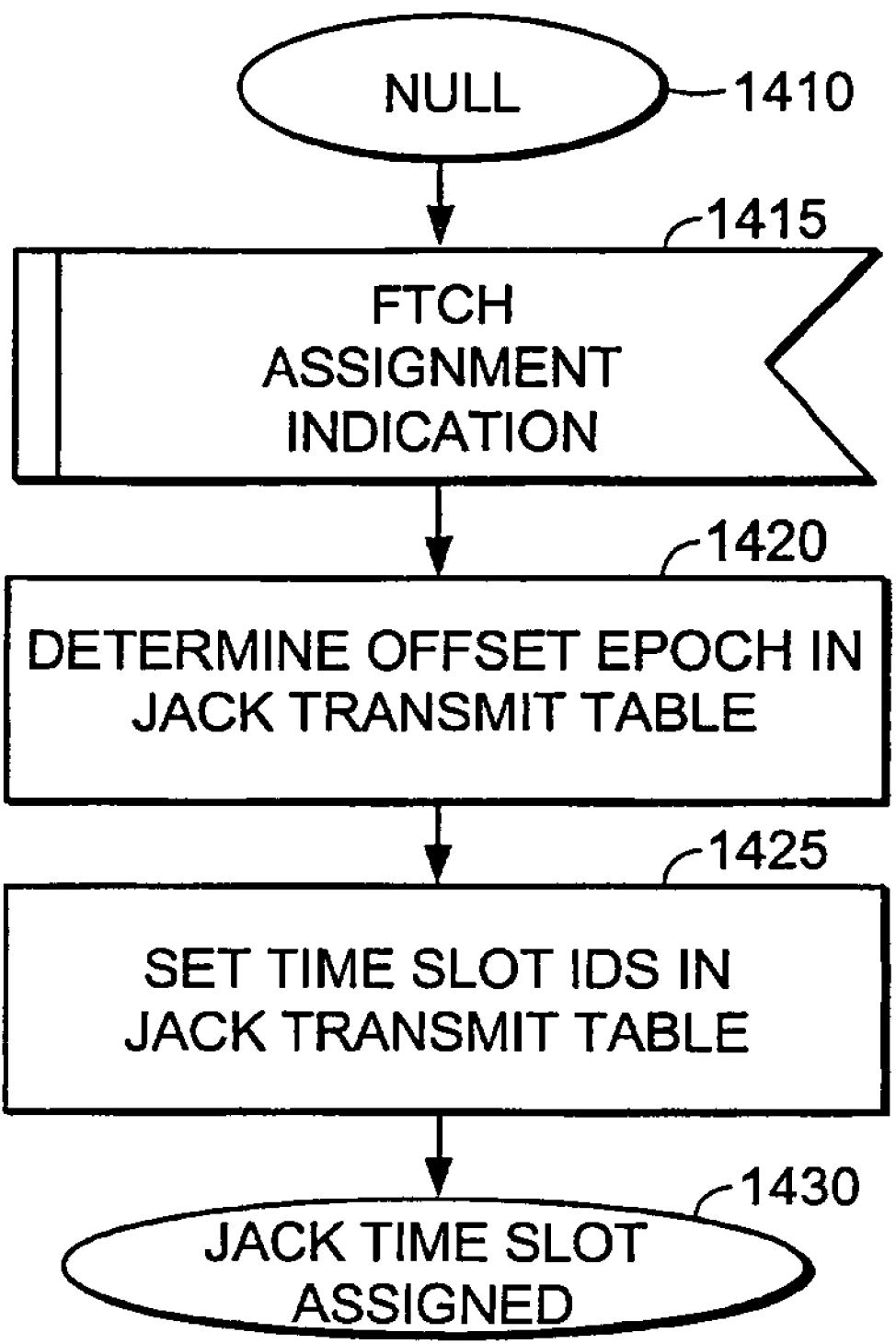
FIG. 14 is a flow chart illustrating how time slot usage of the joint acknowledgment is tracked at a subscriber unit according to the principles of the present invention.

FIG. 14 is a flow chart illustrating JACK channel time slot assignment at a subscriber unit according to the principles of the present invention. Step 1410 illustrates the entry point into this subroutine. In step 1415, the subscriber unit 14 receives notification that a forward traffic channel has been assigned for its use. It is then determined in step 1420 in which epoch the particular subscriber unit 14 will transmit information to the base station 20 over a time slot 310 of the JACK channel 54. As previously discussed, the subscriber unit 14 will transmit an acknowledgment in the JACK channel 54 after a delay of one or more Epochs for a message received in an assigned forward traffic channel. The JACK transmit table is then marked with a flag in step 1425 to indicate in which Epoch and time slot 310 a subscriber unit 14 is to reply for received messages. Step 1430 shows the end of this subroutine.

Figure 15:
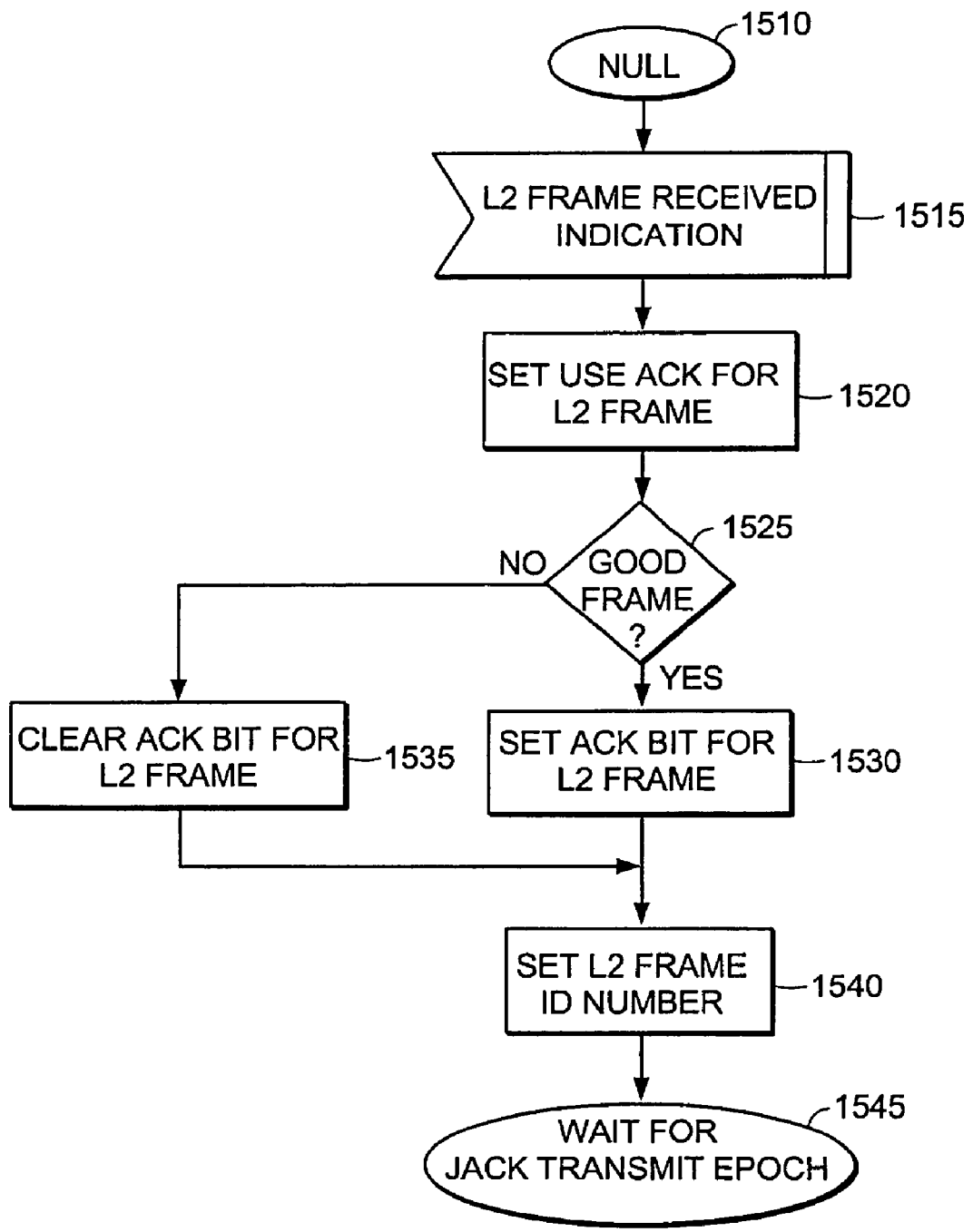
FIG. 15 is a flow chart illustrating how layer 2 acknowledgment messages are generated at a subscriber unit according to the principles of the present invention.

FIG. 15 is a flow chart illustrating the generation of an L2 ACK at a subscriber unit according to the principles of the present invention. Step 1510 illustrates an entry point of the subroutine. In step 1515, an indication is received that messages as received on the forward traffic channel at the subscriber unit have been demodulated and decoded for a particular frame includes L2 ACK information. In step 1520, it is determined that L2 ACK message will be sent and the data ready bit for the L2 ACK message is set high indicating that an L2 message is being transmitted in a particular time slot 310. It is then determined in step 1525 whether a previous frame of data was properly received at the subscriber unit 14 on the forward link traffic channel. For example, there could be a CRC or other type of error indicating non-receipt of frame data. If a frame is properly received, the ACK bit is set indicating such a condition in step 1530. If not, the appropriate bit of the time slot 310 is reset indicating the frame receive error in step 1535. Finally in step 1540, the L2 frame ID tag 325 is encoded in the time slot 310 for the frame number being acknowledged. Step 1545 is the end of this subroutine.

Figure 16:
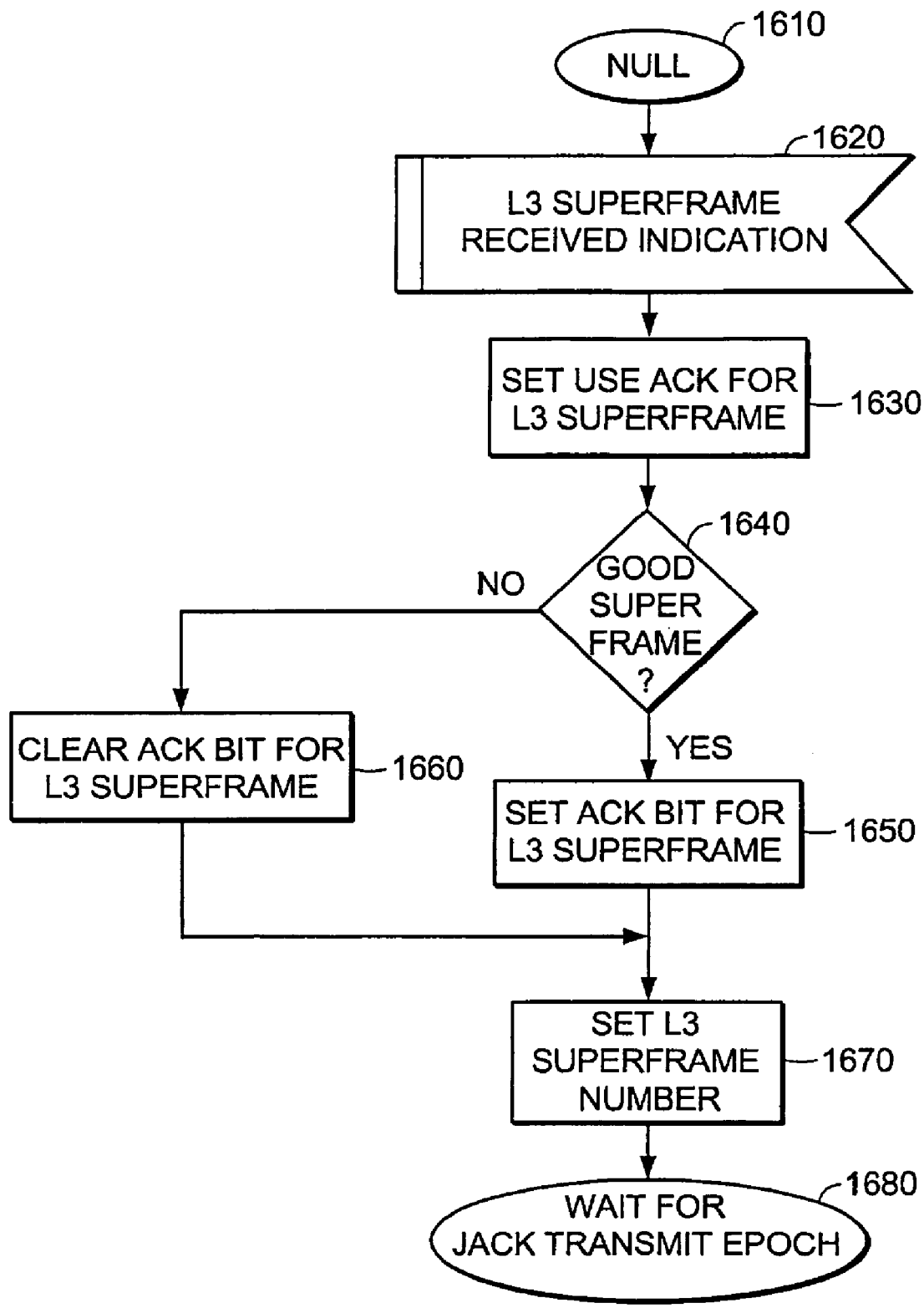
FIG. 16 is a flow chart illustrating how layer 3 acknowledgment messages are generated at a subscriber unit according to the principles of the present invention.

FIG. 16 is a flow chart illustrating the generation of an L3 ACK at a subscriber unit according to the principles of the present invention. Step 1610 illustrates an entry point of the subroutine. In step 1620, an indication is received that messages received on the forward traffic channel at the subscriber unit have been demodulated and decoded for a particular superframe. The data ready bit for the L3 ACK message is set high indicating that an L3 message is being transmitted for a particular time slot 310. It is then determined in step 1640 whether a superframe of data was properly received at the subscriber unit 14 on the forward link traffic channel. For example, there could be a CRC or other type of error indicating non receipt of data. If a superframe is properly received as determined in step 1640, the ACK bit of the time slot 310 is set indicating so in step 1650. If not, the appropriate bit of the time slot 310 is reset indicating the superframe receive error in step 1660. Finally in step 1670, the L3 superframe ID tag 325 is encoded in the time slot 310 for the superframe being acknowledged. Step 1680 is the end of this subroutine.

Figure 17:
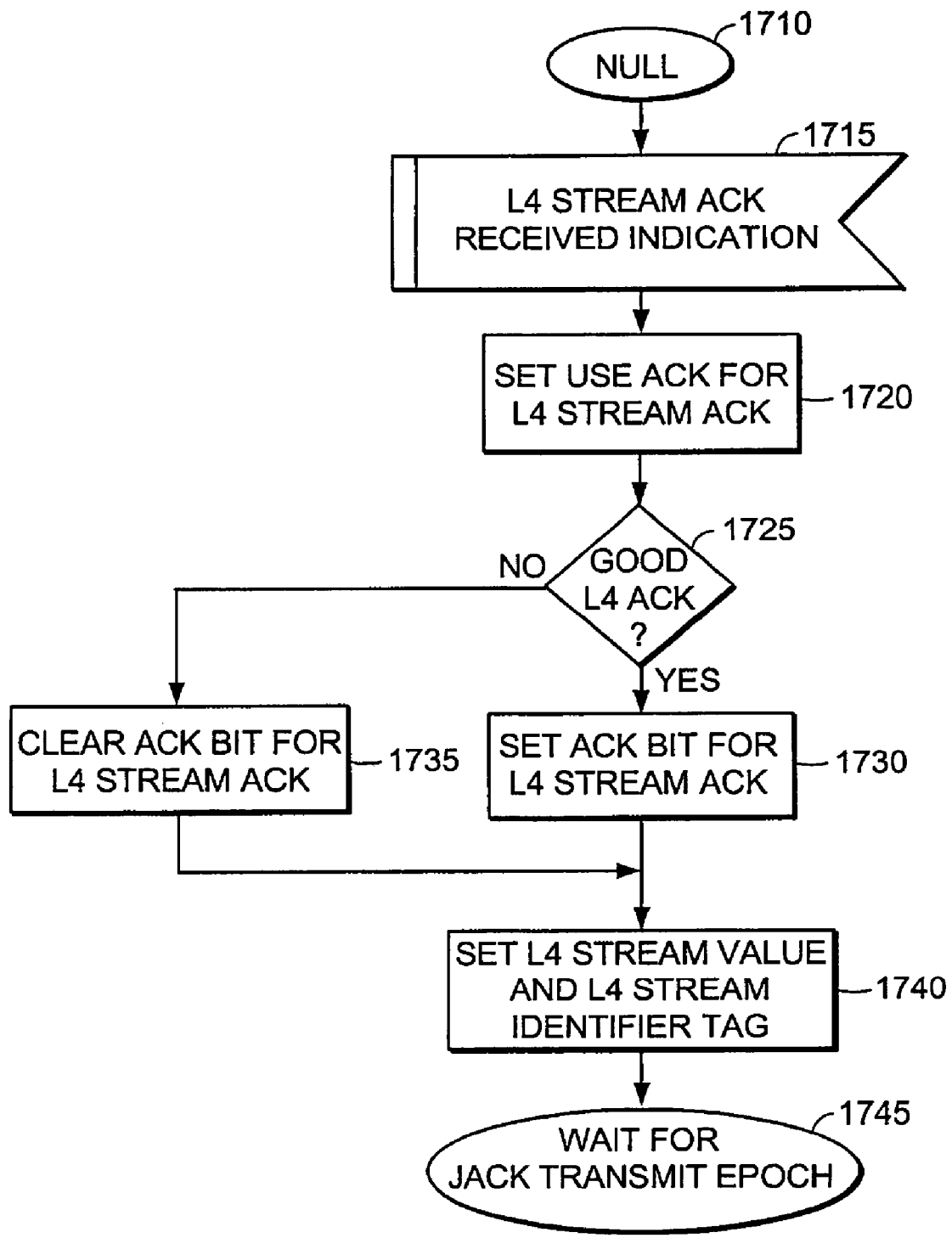
FIG. 17 is a flow chart illustrating how layer 4 acknowledgment messages are generated at a subscriber unit according to the principles of the present invention.

FIG. 17 is a flow chart illustrating the generation of an L3 ACK at a subscriber unit according to the principles of the present invention. Step 1710 illustrates an entry point of the subroutine. In step 1715, an L4 ACK message bound for server 30 as generated by PC device 12 is intercepted at a particular subscriber unit 14. The data ready bit for the L4 ACK message is set high in step 1720 indicating that an L4 message is being transmitted in a particular time slot 310. It is then determined in step 1725 whether the intercepted L4 ACK message was properly received at the subscriber unit 14 from the PC device 12 and that the ACK message should be transmitted over the JACK channel 54. If the L4 ACK should be transmitted in the JACK Channel 54 as determined in step 1725, the L4 ACK bit is set indicating so in step 1730. If not, the appropriate bit of the time slot 310 is reset in step 1735 indicating that a no acknowledgment is being sent to base station 20. Finally in step 1740, the L4 stream value 346 and stream identifier tag 344 are encoded in the time slot 310. Step 1745 indicates the end of this subroutine.

Figure 18:
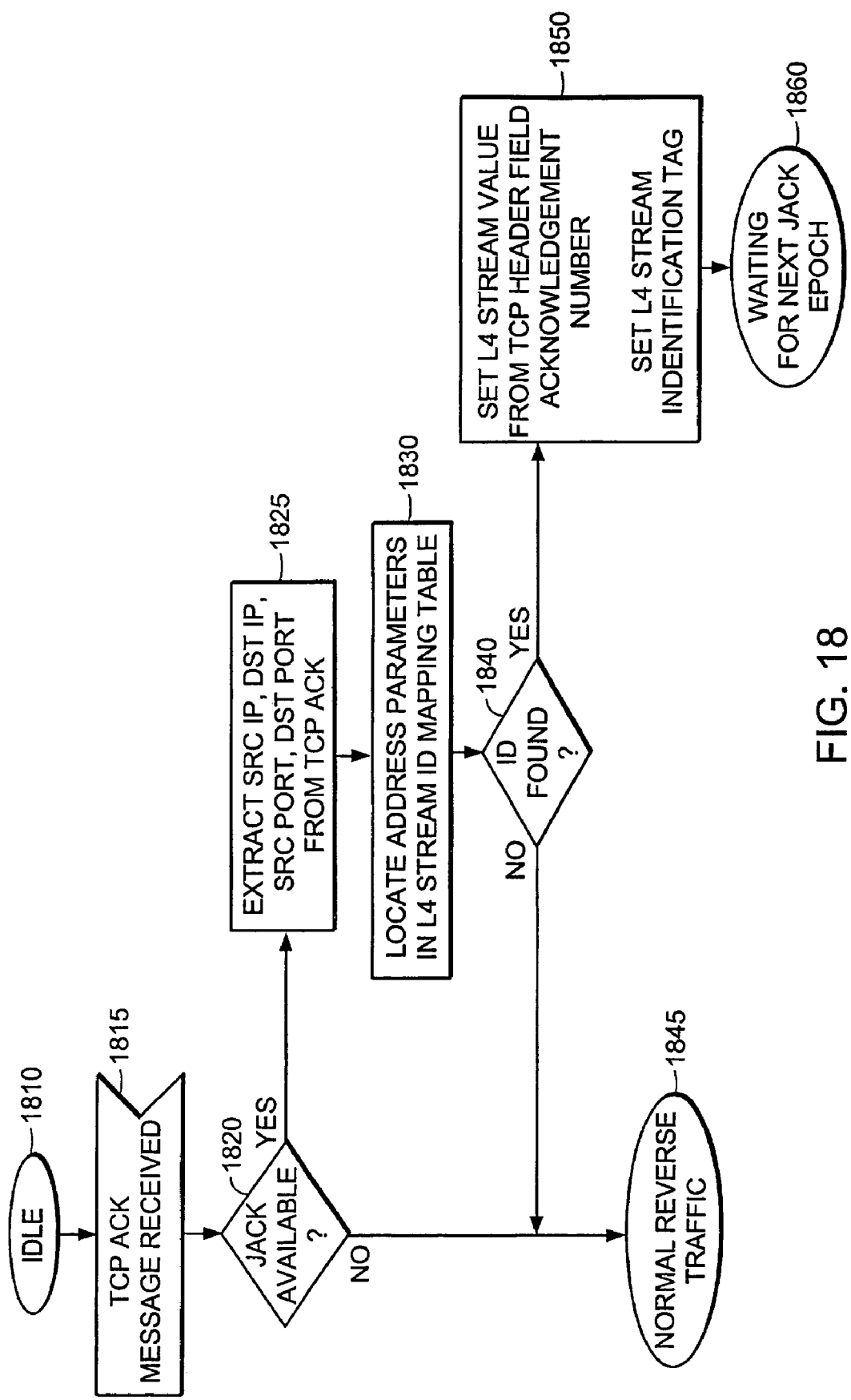
FIG. 18 is a flow chart illustrating how a layer 4 acknowledgment message is generated and transmitted in a jack channel time slot according to the principles of the present invention.

FIG. 18 is a flow chart illustrating how a TCP acknowledgment messages is intercepted and encoded in a time slot according to the principles of the present invention. Step 1810 illustrates an entry point in to this subroutine. In step 1815, a TCP acknowledgment message as generated by PC device 12 is intercepted at subscriber unit 14. It is then determined whether a time slot 310 of the JACK channel 54 has been assigned for use in step 1820. If not, the acknowledgment or other message is transmitted to the base station 20 over another reverse traffic channel in step 1845. If a JACK channel 54 time slot 310 is assigned for use by a subscriber unit 14 as determined in step 1820, the source/destination address and source/destination port number is extracted from the L4 ACK message received from PC device 12 in step 1825. Following step 1830, the corresponding session to which the network packet pertains is located in the table of FIG. 6. If the layer 4 stream ID tag 344 corresponding to a particular session is not found in step 1840, the message is transmitted over a reverse link traffic channel in step 1845. On the other hand, if the layer 4 stream ID tag 344 is identified in step 1840, this ID tag 344 is encoded for transmission in the appropriate time slot 310 for the particular acknowledgment message in step 1850. Also, in step 1850, the L4 stream value 346 in the time slot 310 is encoded based upon the TCP header field acknowledgment number of the network L4 ACK message. Step 1860 indicates the end of this subroutine.

Figure 19:
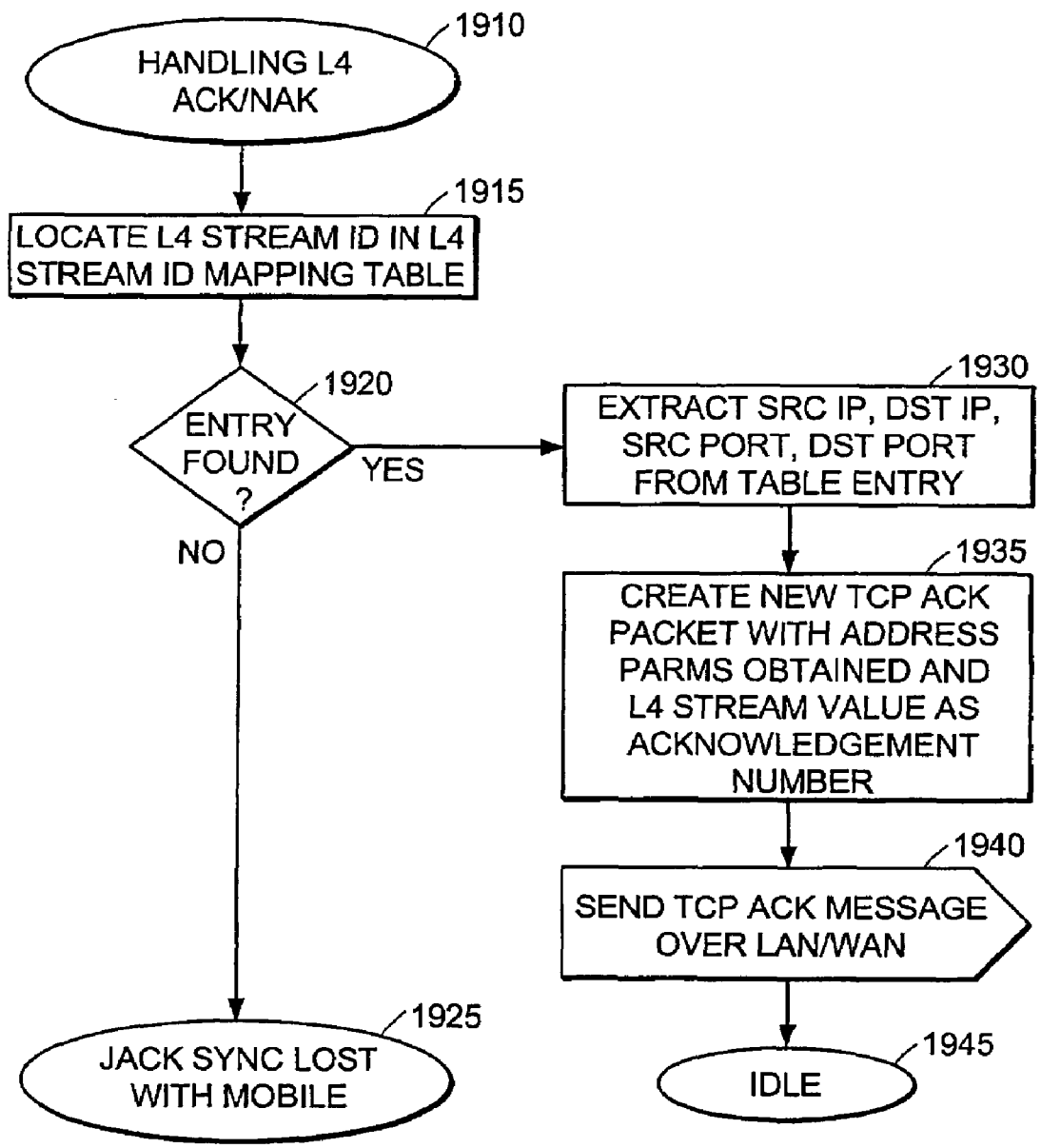
FIG. 19 is a flow chart illustrating how a layer 4 ACK message received in a time slot of the channel is processed at a base station according to the principles of the present invention.

FIG. 19 is a flow chart illustrating how a layer 4 ACK message as encoded in a time slot is reconstructed and transmitted to a target network device such as server 30 according to the principles of the present invention. Step 1910 illustrates an entry point for the subroutine. Based upon the receipt of the layer 4 bit information in a time slot 310 at the base station 20 and, more specifically, the L4 stream ID tag 344, the session corresponding to the stream ID is located in the table of FIG. 6 in step 1915. If an entry is not found in step 1920 for the session, it is presumed the subscriber unit 14 is no longer synchronized with the base station 20 as shown in step 1925. Alternatively, if an entry is found in step 1920, the source/destination address and source/destination port number associated with the ACK message is extracted from the table in step 1930. A switched network packet is then reconstructed in step 1935 to include the parameters of the L4 ACK message as originally intercepted at subscriber unit before it was transmitted over the time slot 310 of the JACK channel 54. Thus, the substitute message as received in a time slot 310 of the JACK channel 54 is converted into a message that be forwarded over a network to a target device in step 1940. Step 1945 illustrates the end of the subroutine.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for communicating information in a wireless communication system, the method comprising:
    allocating at least one reverse link channel to be shared acknowledgement channel that is continuously allocated for carrying acknowledgement information to a base station;
    assigning at least one forward link channel for communicating data payload from the base station to a corresponding field unit; and
    transmitting acknowledgement information associated with the data payload from the corresponding field unit to the base station over the shared acknowledgement channel.

2. A method as in claim 1, further comprising the step of: dividing the acknowledgement channel into multiple time slots.

3. A method as in claim 2, further comprising the step of: assigning a time slot of the acknowledgement channel for use by a field unit to transmit acknowledgement information to the base station.

4. A method as in claim 3, wherein use of an assigned time slot for transmitting messages in a reverse direction is delayed a preselected amount of time after a traffic channel is allocated for transmitting a data payload.

5. A method as in claim 3, further comprising the steps of: allocating additional bandwidth to a field unit for transmitting acknowledgement information when throughput capacity afforded by a single time slot is exceeded.

6. A method as in claim 5, wherein the additional bandwidth is at least part of a traffic channel.

7. A method as in claim 2, wherein the data payload includes at least one network message transmitted between processing devices using a network protocol.

8. A method as in claim 2, wherein the time slots of the acknowledgement channel repeat on a periodic basis.

9. A method as in claim 2, further comprising the step of: synchronizing the acknowledgement channel with another channel in a forward or reverse channel of the communication system so that acknowledgement information is transmitted or received in a corresponding time slot.

10. A method as in claim 2, wherein the time slot includes CRC (Cyclical Redundancy Check) check bits.

11. A method as in claim 2, wherein acknowledgement information is transmitted in at least two time slots from at least two different field units.

12. A method as in claim 2, wherein a time slot is implicitly assigned for use by a field unit based upon an assignment of a corresponding channel for transmitting a data payload from the base station to the field unit.

13. A method as in claim 1, wherein the acknowledgement information is transmitted on an as-needed basis between the base station and corresponding field unit.

14. A method as in claim 1, wherein field units are allocated multiple forward link channels on an as-needed basis to transmit a data payload from the base station to a subscriber field unit and a portion of the acknowledgement channel in a reverse link carries feedback messages to the base station.

15. A method as in claim 1, wherein a first acknowledgement channel is allocated for use in a forward link and a second acknowledgement channel is allocated for use in a reverse link of the wireless communication system.

16. A method as in claim 1, wherein the acknowledgement information indicates that a data payload was properly received.

17. A method as in claim 1, wherein the acknowledgement information indicates that a data payload was not properly received.

18. A method as in claim 1, further comprising the step of: assigning a portion of the acknowledgement channel for use by a field unit to transmit acknowledgement information.

19. A method as in claim 1, wherein the information is communicated in the wireless system includes at least one network message based on TCP/IP (Transmission Control Protocol/Internet Protocol).

20. A method as in claim 1, wherein at least part of the acknowledgement information is generated at a link layer.

21. A method as in claim 1, wherein at least part of the acknowledgement information is generated at a transport layer.

22. A method as in claim 1, wherein the acknowledgement channel is structured to carry information generated at multiple network Layers.

23. A method as in claim 1, wherein the acknowledgement channel is structured to carry generic payload data.

24. A method as in claim 23, wherein the generic payload data is a maintenance message supporting a link between a field unit and the base station.

25. A method as in claim 23, wherein the generic payload data would otherwise be transmitted over a traffic channel.

* * * * *

UNITED STATES PATENT AND TRADEMARK OFFICE
CERTIFICATE OF CORRECTION

PATENT NO. : 7,502,351 B2
APPLICATION NO. : 11/235725
DATED : March 10, 2009
INVENTOR(S) : Farley et al.

It is certified that error appears in the above-identified patent and that said Letters Patent is hereby corrected as shown below:

IN THE ABSTRACT

At section (57), ABSTRACT, page 1, right column, line 11, after the word "message" delete "is" and insert therefor --was--.

IN THE SPECIFICATION

At column 1, line 21, after the word "data", delete "is" and insert therefor --has been--.

At column 2, line 3, after the word "message" delete "is" and insert therefor --has been--.

At column 5, line 25, after the word "whole" delete "a".

At column 11, line 53, after the words "time-slotted", delete "channel" and insert therefor --channels--.

At column 12, line 13, after the word "messages", delete "was" and insert therefor --were--.

At column 12, line 51, after "FEC" delete "(Formal", and insert therefor --Forward--.

At column 15, line 53, before the word "identified" insert --be--.

At column 17, line 5, before the word "properly" delete "is" and insert therefor --has been--.

At column 18, line 30, before the word "received" delete "is" and insert therefor --has been--.

At column 20, line 29, before the words "is intercepted" delete "messages" and insert therefor --message--.

UNITED STATES PATENT AND TRADEMARK OFFICE
CERTIFICATE OF CORRECTION

PATENT NO. : 7,502,351 B2
APPLICATION NO. : 11/235725
DATED : March 10, 2009
INVENTOR(S) : Farley et al.

It is certified that error appears in the above-identified patent and that said Letters Patent is hereby corrected as shown below:

At column 21, line 6, before the words "be for-" insert --will--.

Signed and Sealed this

Eleventh Day of August, 2009

David J. Kappos
*Director of the United States Patent and Trademark Office*